United States Patent
Toshiyuki

(10) Patent No.: US 12,451,818 B2
(45) Date of Patent: Oct. 21, 2025

(54) INVERTER

(71) Applicant: DENSO CORPORATION, Kariya (JP)

(72) Inventor: Ken Toshiyuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 208 days.

(21) Appl. No.: 18/374,785

(22) Filed: Sep. 29, 2023

(65) Prior Publication Data

US 2024/0030831 A1 Jan. 25, 2024

Related U.S. Application Data

(63) Continuation of application No. PCT/JP2021/033216, filed on Sep. 9, 2021.

(30) Foreign Application Priority Data

Mar. 29, 2021 (JP) ................................. 2021-055374

(51) Int. Cl.
*H02M 7/487* (2007.01)
*H02M 1/00* (2006.01)
*H02M 7/5387* (2007.01)
*H02P 27/06* (2006.01)

(52) U.S. Cl.
CPC ..... *H02M 7/53871* (2013.01); *H02M 1/0009* (2021.05); *H02M 7/487* (2013.01); *H02P 27/06* (2013.01)

(58) Field of Classification Search
CPC .. H02M 7/53871; H02M 1/0009; H02M 1/32; H02M 1/325; H02M 7/487; H02P 27/06
See application file for complete search history.

(56) References Cited

U.S. PATENT DOCUMENTS

| | | | |
|---|---|---|---|
| 9,847,744 B2 * | 12/2017 | Fujii | .......... H02P 21/22 |
| 11,984,818 B2 * | 5/2024 | Toshiyuki | .......... H02M 1/0009 |
| 2018/0109201 A1 * | 4/2018 | Li | .......... F03D 17/00 |

FOREIGN PATENT DOCUMENTS

| | | |
|---|---|---|
| JP | 2013-150425 A | 8/2013 |
| JP | 2016-220325 A | 12/2016 |

* cited by examiner

*Primary Examiner* — Adolf D Berhane
(74) *Attorney, Agent, or Firm* — Oliff PLC

(57) ABSTRACT

In an inverter according to the present disclosure, in an emergency operation, a control circuit changes the electric potential of a restricted output wiring between two of a higher potential, a neutral-point potential and a lower potential excluding a forbidden potential, and changes each of the electric potentials of normal output wirings between the higher potential, the neutral-point potential and the lower potential. Moreover, in a restricted state where a command value vector belongs to one of first restricted triangular regions, the control circuit outputs coordinates of an origin, first coordinates and second coordinates at staggered times. The second coordinates are lower coordinates of a second intermediate coordinate point when the first coordinates are upper coordinates of a first intermediate coordinate point, and are upper coordinates of the second intermediate coordinate point when the first coordinates are lower coordinates of the first intermediate coordinate point.

6 Claims, 24 Drawing Sheets

FIG.2

| STATE | 1ST STATE | 2ND STATE | 3RD STATE |
|---|---|---|---|
| 1ST SWITCHING ELEMENT 41 | ON | OFF | OFF |
| 2ND SWITCHING ELEMENT 42 | ON | ON | OFF |
| 3RD SWITCHING ELEMENT 43 | OFF | ON | ON |
| 4TH SWITCHING ELEMENT 44 | OFF | OFF | ON |
| ELECTRIC POTENTIAL OF OUTPUT WIRING 60 | VH | VM | 0V |

| SHORT-CIRCUITED ELEMENT | FORBIDDEN POTENTIAL |
|---|---|
| 1ST SWITCHING ELEMENT 41 | VM |
| 2ND SWITCHING ELEMENT 42 | 0V |
| 3RD SWITCHING ELEMENT 43 | VH |
| 4TH SWITCHING ELEMENT 44 | VM |
| 1ST DIODE 51 | VH |
| 2ND DIODE 52 | 0V |

FIG.22

| STATE | 1ST STATE | 2ND STATE | 3RD STATE |
|---|---|---|---|
| 1ST SWITCHING ELEMENT 41 | ON | OFF | OFF |
| 2ND SWITCHING ELEMENT 42 | OFF | ON | OFF |
| 3RD SWITCHING ELEMENT 43 | OFF | ON | OFF |
| 4TH SWITCHING ELEMENT 44 | OFF | OFF | ON |
| ELECTRIC POTENTIAL OF OUTPUT WIRING 60 | VH | VM | 0V |

INVERTER

CROSS-REFERENCE TO RELATED APPLICATIONS

The present application is a continuation application of International Application No. PCT/JP2021/033216 filed on Sep. 9, 2021, which is based on and claims priority from Japanese Patent Application No. 2021-055374 filed on Mar. 29, 2021. The entire contents of these applications are incorporated by reference into the present application.

BACKGROUND

1 Technical Field

The present disclosure relates to inverters.

2 Description of Related Art

There is known an inverter that can change output electric potentials at three levels. Specifically, the inverter has an upper capacitor connected between a higher-potential wiring and a neutral point, and a lower capacitor connected between the neutral point and a lower-potential wiring. Therefore, the electric potential at the neutral point is between the electric potential of the higher-potential wiring and the electric potential of the lower-potential wiring. Moreover, the inverter has three switching circuits each corresponding to one of three output wirings (i.e., U-phase, V-phase and W-phase output wirings). Each of the switching circuits has a plurality of semiconductor elements. Moreover, each of the switching circuits changes the electric potential of the corresponding output wiring between a higher potential, a neutral-point potential and a lower-potential by operating the semiconductor elements. Consequently, with the changes in the electric potentials of the output wirings between the three levels, three-phase alternating current is generated between the output wirings.

SUMMARY

According to the present disclosure, there is provided an inverter which includes: a higher-potential wiring; a lower-potential wiring; a neutral point; an upper capacitor connected between the higher-potential wiring and the neutral point; a lower capacitor connected between the neutral point and the lower-potential wiring; three switching circuits which include a U-phase switching circuit, a V-phase switching circuit and a W-phase switching circuit; a command circuit; and a control circuit. Each of the three switching circuits includes a plurality of semiconductor elements and an output wiring. The control circuit controls the three switching circuits so as to change each of electrical potentials of a U-phase output wiring, a V-phase output wiring and a W-phase output wiring between a higher potential, a neutral-point potential and a lower-potential. The U-phase output wiring is the output wiring of the U-phase switching circuit. The V-phase output wiring is the output wiring of the V-phase switching circuit. The W-phase output wiring is the output wiring of the W-phase switching circuit. The higher potential is an electric potential of the higher-potential wiring. The neutral-point potential is an electric potential at the neutral point. The lower potential is an electric potential of the lower-potential wiring. The command circuit generates a command value vector constituted of a voltage vector represented by a spatial vector coordinate system defined by parameters Vu, Vv and Vw. The parameter Vu is a parameter indicating whether the electric potential of the U-phase output wiring is the higher potential, the neutral-point potential or the lower potential. The parameter Vv is a parameter indicating whether the electric potential of the V-phase output wiring is the higher potential, the neutral-point potential or the lower potential. The parameter Vw is a parameter indicating whether the electric potential of the W-phase output wiring is the higher potential, the neutral-point potential or the lower potential. The control circuit controls the three switching circuits based on the command value vector. The spatial vector coordinate system has a plurality of intermediate coordinate points located between an origin and outermost coordinate points. Each of the plurality of intermediate coordinate points has both a set of upper coordinates representing a voltage vector that changes a voltage of the upper capacitor and a set of lower coordinates representing a voltage vector that changes a voltage of the lower capacitor. The spatial vector coordinate system has a plurality of triangular regions each of which has three vertices respectively constituted of the origin and adjacent two of the plurality of intermediate coordinate points. The control circuit is configured to perform an emergency operation when one of the semiconductor elements is short-circuited so that in one of the three switching circuits, a forbidden potential cannot be applied to the output wiring, the forbidden potential being either of the higher potential and the lower potential. The one of the semiconductor elements which is short-circuited constitutes a short-circuited element. The output wiring of that one of the three switching circuits which includes the short-circuited element constitutes a restricted output wiring. The output wirings of those two of the three switching circuits which do not include the short-circuited element constitute normal output wirings. In the emergency operation, the control circuit changes the electric potential of the restricted output wiring between two of the higher potential, the neutral-point potential and the lower potential excluding the forbidden potential, and changes each of the electric potentials of the normal output wirings between the higher potential, the neutral-point potential and the lower potential. In the emergency operation, the plurality of intermediate coordinate points include a plurality of normal intermediate coordinate points at each of which neither the set of upper coordinates and the set of lower coordinates includes a forbidden parameter representing the forbidden potential, and a plurality of restricted intermediate coordinate points at each of which one of the set of upper coordinates and the set of lower coordinates includes the forbidden parameter and the other of the set of upper coordinates and the set of lower coordinates does not include the forbidden parameter. In the emergency operation, the plurality of triangular regions include first restricted triangular regions in each of which the two intermediate coordinate points respectively constituting two of the three vertices are respectively two of the restricted intermediate coordinate points, second restricted triangular regions in each of which one of the two intermediate coordinate points respectively constituting two of the three vertices is one of the normal intermediate coordinate points and the other of the two intermediate coordinate points is one of the restricted intermediate coordinate points, and normal triangular regions in each of which the two intermediate coordinate points respectively constituting two of the three vertices are respectively two of the normal intermediate coordinate points. In the emergency operation, in a restricted state where the command value vector belongs to one of the first restricted triangular regions, the control circuit outputs, at staggered times, coordinates of the origin, first coordinates that are coordinates of a first intermediate coordinate point and second coordinates that are coordinates of a second intermediate coordinate point. In the restricted state, of the two intermediate coordinate points that form a diagonal, which does not include the origin, of a quadrangle formed by a specific first restricted triangular region and an adjacent second restricted triangular region, the intermediate coordinate point within the specific first restricted triangular region is the first intermediate coordinate point and the intermediate coordinate point within the adjacent second restricted triangular region is the second intermediate coordinate point. The specific first restricted triangular region is the one of the first restricted triangular regions to which the command value vector belongs, and the adjacent second restricted triangular region is one of the second restricted triangular regions which is adjacent to the specific first restricted triangular region. The first coordinates are that one of the set of upper coordinates and the set of lower coordinates of the first intermediate coordinate point which does not include the forbidden parameter. The second coordinates are the set of lower coordinates of the second intermediate coordinate point when the first coordinates are the set of upper coordinates of the first intermediate coordinate point, and are the set of upper coordinates of the second intermediate coordinate point when the first coordinates are the set of lower coordinates of the first intermediate coordinate point.

It should be noted that the expression "the command value vector belongs to one of the first restricted triangular regions" denotes that at least part of the command value vector is located within one of the first restricted triangular regions. Accordingly, when the command value vector belongs to one of the first restricted triangular regions, the command value vector may be completely included in the first restricted triangular region or pass through the first restricted triangular region.

BRIEF DESCRIPTION OF THE DRAWINGS

FIG. 2 is a tabular representation illustrating first to third states of each switching circuit according to the first embodiment.

FIG. 22 is a tabular representation illustrating first to third states of each switching circuit according to the second embodiment.

DESCRIPTION OF EMBODIMENTS

Figure 1:
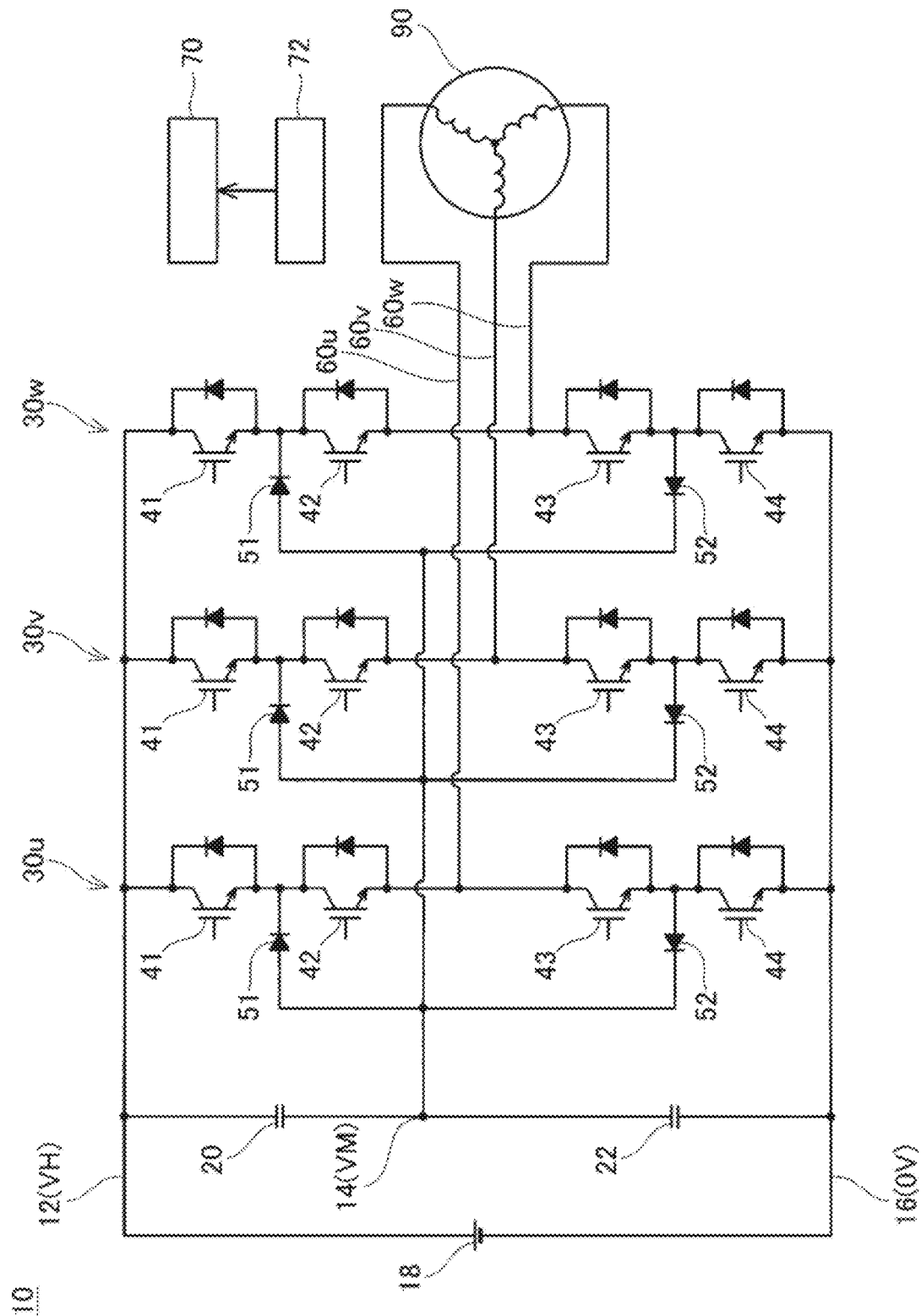
FIG. 1 is a circuit diagram of an inverter according to a first embodiment.

In the above-described inverter known in the art (see, for example, Japanese Unexamined Patent Application Publication No. 2016-220325), the semiconductor elements in the switching circuits may be short-circuited. In this case, in the switching circuit(s) having a short-circuited element, it may become impossible to apply a specific electric potential to the output wiring. For example, when one of the semiconductor elements is short-circuited, an inter-line short circuit may occur between the higher-potential wiring, the neutral point and the lower-potential wiring upon another semiconductor element (hereinafter, to be referred to as the specific element) that is connected with the short-circuited element being turned on. Therefore, the specific element is not allowed to be turned on; thus, it becomes impossible for one of the higher potential, the neutral-point potential and the lower potential to be applied to the output wiring. Hereinafter, the electric potential that cannot be applied to the output wiring will be referred to as the forbidden potential.

There are cases where it is desired to generate three-phase alternating current using the inverter even when one of the semiconductor elements is short-circuited. In these cases, it is conceivable to change the electric potentials of the output wirings between the other two electric potentials than the forbidden potential.

When the forbidden potential is the neutral-point potential, three-phase alternating current can be generated by changing the electric potentials of the three output wirings between the higher potential and the lower potential. In this case, the inverter can continuously generate three-phase alternating current.

When the forbidden potential is the lower potential, three-phase alternating current can be generated by changing the electric potentials of the three output wirings between the higher potential and the neutral-point potential. However, in this case, the inverter cannot continuously generate three-phase alternating current. Specifically, in this case, electric charge stored in the upper capacitor is continuously used; consequently, after the elapse of a certain time, the amount of electric charge stored in the upper capacitor will become extremely small and thus the neutral-point potential will become extremely high. As a result, with the extremely high neutral-point potential, it will become impossible for the inverter to suitably generate three-phase alternating current.

When the forbidden potential is the higher potential, three-phase alternating current can be generated by changing the electric potentials of the three output wirings between the neutral-point potential and the lower potential. However, in this case, the inverter cannot continuously generate three-phase alternating current. Specifically, in this case, electric charge stored in the lower capacitor is continuously used; consequently, after the elapse of a certain time, the amount of electric charge stored in the lower capacitor will become extremely small and thus the neutral-point potential will become extremely low. As a result, with the extremely low neutral-point potential, it will become impossible for the inverter to suitably generate three-phase alternating current.

As explained above, it is impossible for the inverter known in the art to continuously generate three-phase alternating current when the forbidden potential is the higher potential or the lower potential.

The present disclosure has been accomplished in view of the above problem with the inverter known in the art.

In the above-described inverter according to the present disclosure, in each of the first restricted triangular regions, both the intermediate coordinate points are the restricted intermediate coordinate points. Moreover, for each of the two restricted intermediate coordinate points, one of the set of upper coordinates and the set of lower coordinates is not allowed to be outputted. Therefore, if the coordinates of the two restricted intermediate coordinate points are outputted at staggered times, the upper coordinates or the lower coordinates will be disproportionately outputted. Moreover, if the upper coordinates or the lower coordinates are disproportionately outputted, the neutral-point potential tends to vary. In this regard, in the inverter according to the present disclosure, in the restricted state where the command value vector belongs to one of the first restricted triangular regions, the first coordinates that are coordinates of the first intermediate coordinate point and the second coordinates that are coordinates of the second intermediate coordinate point are outputted at staggered times. The second intermediate coordinate point is an intermediate coordinate point within that one of the second restricted triangular regions which is adjacent to the first restricted triangular region to which the command value vector belongs. That is, the second intermediate coordinate point is one of the normal intermediate coordinate points. Therefore, neither the set of upper coordinates nor the set of lower coordinates of the second intermediate coordinate point includes the forbidden parameter. Accordingly, both the set of upper coordinates and the set of lower coordinates of the second intermediate coordinate point are allowed to be outputted. In the inverter according to the present disclosure, in the case of the set of upper coordinates of the first intermediate coordinate point being outputted as the coordinates of the first intermediate coordinate point (i.e., as the first coordinates), the set of lower coordinates of the second intermediate coordinate point is outputted as the coordinates of the second intermediate coordinate point (i.e., as the second coordinates). Moreover, in the inverter according to the present disclosure, in the case of the set of lower coordinates of the first intermediate coordinate point being outputted as the coordinates of the first intermediate coordinate point (i.e., as the first coordinates), the set of upper coordinates of the second intermediate coordinate point is outputted as the coordinates of the second intermediate coordinate point (i.e., as the second coordinates). Consequently, variation in the neutral-point potential can be suppressed.

In further implementations of the inverter according to the present disclosure, in the restricted state, the command circuit may generate the command value vector that does not exceed a line segment connecting the first intermediate coordinate point and the second intermediate coordinate point.

With the above configuration, it will become easy for the control circuit to output the voltage vector according to the command value vector.

In the emergency operation, in a preliminary state where the command value vector belongs to one of the second restricted triangular regions, the control circuit may output, at staggered times, the coordinates of the origin, third coordinates that are coordinates of a third intermediate coordinate point and fourth coordinates that are coordinates of a fourth intermediate coordinate point. In the preliminary state, of the two intermediate coordinate points that form a diagonal, which does not include the origin, of a quadrangle formed by a specific second restricted triangular region and an adjacent first restricted triangular region, the intermediate coordinate point within the adjacent first restricted triangular region may be the third intermediate coordinate point and the intermediate coordinate point within the specific second restricted triangular region may be the fourth intermediate coordinate point. The specific second restricted triangular region may be the one of the second restricted triangular regions to which the command value vector belongs, and the adjacent first restricted triangular region may be one of the first restricted triangular regions which is adjacent to the specific second restricted triangular region. The third coordinates may be that one of the set of upper coordinates and the set of lower coordinates of the third intermediate coordinate point which does not include the forbidden parameter. The fourth coordinates may be the set of lower coordinates of the fourth intermediate coordinate point when the third coordinates are the set of upper coordinates of the third intermediate coordinate point, and be the set of upper coordinates of the fourth intermediate coordinate point when the third coordinates are the set of lower coordinates of the third intermediate coordinate point.

It should be noted that the expression "the command value vector belongs to one of the second restricted triangular regions" denotes that at least part of the command value vector is located within one of the second restricted triangular regions. Accordingly, when the command value vector belongs to one of the second restricted triangular regions, the command value vector may be completely included in the second restricted triangular region or pass through the second restricted triangular region.

With the above configuration, the output time of the lower coordinates in the preliminary state will become longer when the output time of the upper coordinates in the restricted state is longer; and the output time of the upper coordinates in the preliminary state will become longer when the output time of the lower coordinates in the restricted state is longer. Consequently, it will become easy for the output time of the upper coordinates and the output time of the lower coordinates to be balanced over the entire period from the restricted state to the preliminary state. As a result, it will become possible to more effectively suppress variation in the neutral-point potential.

In the preliminary state, the command circuit may generate the command value vector that does not exceed a line segment connecting the third intermediate coordinate point and the fourth intermediate coordinate point.

With the above configuration, it will become easier for the control circuit to output the voltage vector according to the command value vector.

Each of the three switching circuits may include: a first switching element whose positive electrode is connected with the higher-potential wiring; a second switching element whose positive electrode is connected with a negative electrode of the first switching element and whose negative electrode is connected with the output wiring; a third switching element whose positive electrode is connected with the output wiring; a fourth switching element whose positive electrode is connected with a negative electrode of the third switching element and whose negative electrode is connected with the lower-potential wiring; a first diode whose anode is connected with the neutral point and whose cathode is connected with the negative electrode of the first switching element; and a second diode whose anode is connected with the negative electrode of the third switching element and whose cathode is connected with the neutral point. When the short-circuited element is the second switching element or the second diode, the forbidden potential may be the lower potential. When the short-circuited element is the third switching element or the first diode, the forbidden potential may be the higher potential.

Alternatively, each of the three switching circuits may include: a first switching element connected between the higher-potential wiring and the output wiring; a second switching element connected between the neutral point and the output wiring; a third switching element connected in series with the second switching element between the neutral point and the output wiring; a fourth switching element connected between the output wiring and the lower-potential wiring; a first intermediate diode connected, with its cathode oriented toward the neutral point side, in parallel to the second switching element; and a second intermediate diode connected, with its cathode oriented toward the output wiring side, in parallel to the third switching element. When the short-circuited element is the second switching element, the forbidden potential may be the lower potential. When the short-circuited element is the third switching element, the forbidden potential may be the higher potential.

Hereinafter, exemplary embodiments will be described with reference to the drawings.

First Embodiment (Configuration of Inverter)

FIG. 1 is a circuit diagram of an inverter 10 according to the first embodiment. The inverter 10 is installed in a vehicle. In the vehicle, there are also installed a battery 18 and a motor 90. The motor 90 is a motor for powering the vehicle to travel. Moreover, the motor 90 is a three-phase motor. The inverter 10 is connected with both the battery 18 and the motor 90. The inverter 10 converts DC power supplied from the battery 18 into three-phase AC power and supplies the three-phase AC power to the motor 90. Consequently, the motor 90 is driven to power the vehicle to travel.

The inverter 10 has a higher-potential wiring 12, a neutral point 14, a lower-potential wiring 16, an upper capacitor 20 and a lower capacitor 22. The higher-potential wiring 12 is connected with a positive electrode of the battery 18. On the other hand, the lower-potential wiring 16 is connected with a negative electrode of the battery 18. Hereinafter, the electric potential of the lower-potential wiring 16 is defined as a reference potential (0V). A DC voltage is applied between the higher-potential wiring 12 and the lower-potential wiring 16 by the battery 18. Therefore, the higher-potential wiring 12 has an electric potential VH higher than the electric potential (0V) of the lower-potential wiring 16. The upper capacitor 20 is connected between the higher-potential wiring 12 and the neutral point 14. On the other hand, the lower capacitor 22 is connected between the neutral point 14 and the lower-potential wiring 16. Therefore, the electric potential VM of the neutral point 14 (hereinafter, to be referred to as the neutral-point potential VM) is higher than the electric potential (0V) of the lower-potential wiring 16 and lower than the electric potential VH of the higher-potential wiring 12. The neutral-point potential VM varies depending on both the amount of electric charge stored in the upper capacitor and the amount of electric charge stored in the lower capacitor 22. Specifically, the neutral-point potential VM rises when the upper capacitor 20 is discharged or the lower capacitor 22 is charged. Conversely, the neutral-point potential VM drops when the upper capacitor 20 is charged or the lower capacitor 22 is discharged.

The inverter 10 includes three switching circuits 30, i.e., a U-phase switching circuit 30$u$, a V-phase switching circuit 30$v$ and a W-phase switching circuit 30$w$. Each of the switching circuits 30 is connected between the higher-potential wiring 12, the lower-potential wiring 16 and the neutral point 14. Moreover, each of the switching circuits 30 includes a first switching element 41, a second switching element 42, a third switching element 43, a fourth switching element 44, a first diode 51, a second diode 52 and an output wiring 60. The three switching circuits 30 are identical in configuration to each other; therefore, the configuration of only one of the switching circuits 30 will be described below.

Each of the switching elements 41 to 44 is constituted of an IGBT (Insulated Gate Bipolar Transistor). It should be noted that each of the switching elements 41 to 44 may alternatively be constituted of other elements, such as a FET (Field Effect Transistor). Moreover, each of the switching elements 41 to 44 has a freewheeling diode connected in parallel thereto. Specifically, the freewheeling diode has its anode connected with the emitter of the corresponding switching element, and its cathode connected with the collector of the corresponding switching element. The switching elements 41 to 44 are connected in series with each other between the higher-potential wiring 12 and the lower-potential wiring 16. Specifically, the collector of the first switching element 41 is connected with the higher-potential wiring 12. The collector of the second switching element 42 is connected with the emitter of the first switching element 41. The collector of the third switching element 43 is connected with the emitter of the second switching element 42. The collector of the fourth switching element 44 is connected with the emitter of the third switching element 43. The emitter of the fourth switching element 44 is connected with the lower-potential wiring 16. The anode of the first diode 51 is connected with the neutral point 14. The cathode of the first diode 51 is connected with both the emitter of the first switching element 41 and the collector of the second switching element 42. The anode of the second diode 52 is connected with both the emitter of the third switching element 43 and the collector of the fourth switching element 44. The cathode of the second diode 52 is connected with the neutral point 14. One end of the output wiring 60 is connected with both the emitter of the second switching element 42 and the collector of the third switching element 43. The other end of the output wiring 60 is connected with the motor 90.

In addition, hereinafter, the output wiring 60 of the U-phase switching circuit 30$u$ will be referred to as the U-phase output wiring 60$u$; the output wiring 60 of the V-phase switching circuit 30$v$ will be referred to as the V-phase output wiring 60$v$; and the output wiring 60 of the W-phase switching circuit 30$w$ will be referred to as the W-phase output wiring 60W. Each of the U-phase output wiring 60$u$, the V-phase output wiring 60$v$ and the W-phase output wiring 60$w$ is connected with the motor 90.

The inverter 10 includes a control circuit 70 and a command circuit 72. The command circuit 72 generates command values according to the operating state of the motor 90 and inputs the generated command values to the control circuit 70. Although not shown in the drawings, the control circuit 70 is connected with the gates of the switching elements 41 to 44 of each of the U-phase switching circuit 30$u$, the V-phase switching circuit 30$v$ and the W-phase switching circuit 30$w$. That is, the control circuit 70 is connected with the gates of all the twelve switching elements shown in FIG. 1. The control circuit 70 turns on and off each switching element based on the command values inputted from the command circuit 72. Consequently, three-phase alternating current is generated between the three output wirings 60. Further, with supply of the three-phase alternating current to the motor 90, the motor 90 is driven to power the vehicle to travel.

(Electric Potential of Output Wiring)

Next, the electric potential applied to each output wiring 60 will be described. The control circuit 70 controls each switching circuit 30 to be in one of a first state, a second state and a third state as shown in FIG. 2.

In the first state, the first switching element 41 is in the ON state; the second switching element 42 is in the ON state; the third switching element 43 is in the OFF state; and the fourth switching element 44 is in the OFF state. Therefore, in the first state, the output wiring 60 is connected with the higher-potential wiring 12 via the first switching element 41 and the second switching element 42. Consequently, in the first state, the electric potential of the output wiring 60 becomes equal to the electric potential VH of the higher-potential wiring 12.

In the second state, the first switching element 41 is in the OFF state; the second switching element 42 is in the ON state; the third switching element 43 is in the ON state; and the fourth switching element 44 is in the OFF state. Therefore, in the second state, the output wiring 60 is connected with the neutral point 14 via the second switching element 42 and the first diode 51 or via the third switching element 43 and the second diode 52. Consequently, in the second state, the electric potential of the output wiring 60 becomes equal to the neutral-point potential VM.

In the third state, the first switching element 41 is in the OFF state; the second switching element 42 is in the OFF state; the third switching element 43 is in the ON state; and the fourth switching element 44 is in the ON state. Therefore, in the third state, the output wiring 60 is connected with the lower-potential wiring 16 via the third switching element 43 and the fourth switching element 44. Consequently, in the third state, the electric potential of the output wiring 60 becomes equal to the electric potential of the lower-potential wiring 16, i.e., 0V.

With change in the states of the switching circuits 30 between the first state, the second state and the third state, the electric potentials of the output wirings 60 change between the electric potential VH, the neutral-point potential VM and 0V. The control circuit 70 generates three-phase alternating current in the output wirings 60 by controlling the electric potentials of the output wirings 60.

(Voltage Vector)

Figure 3:
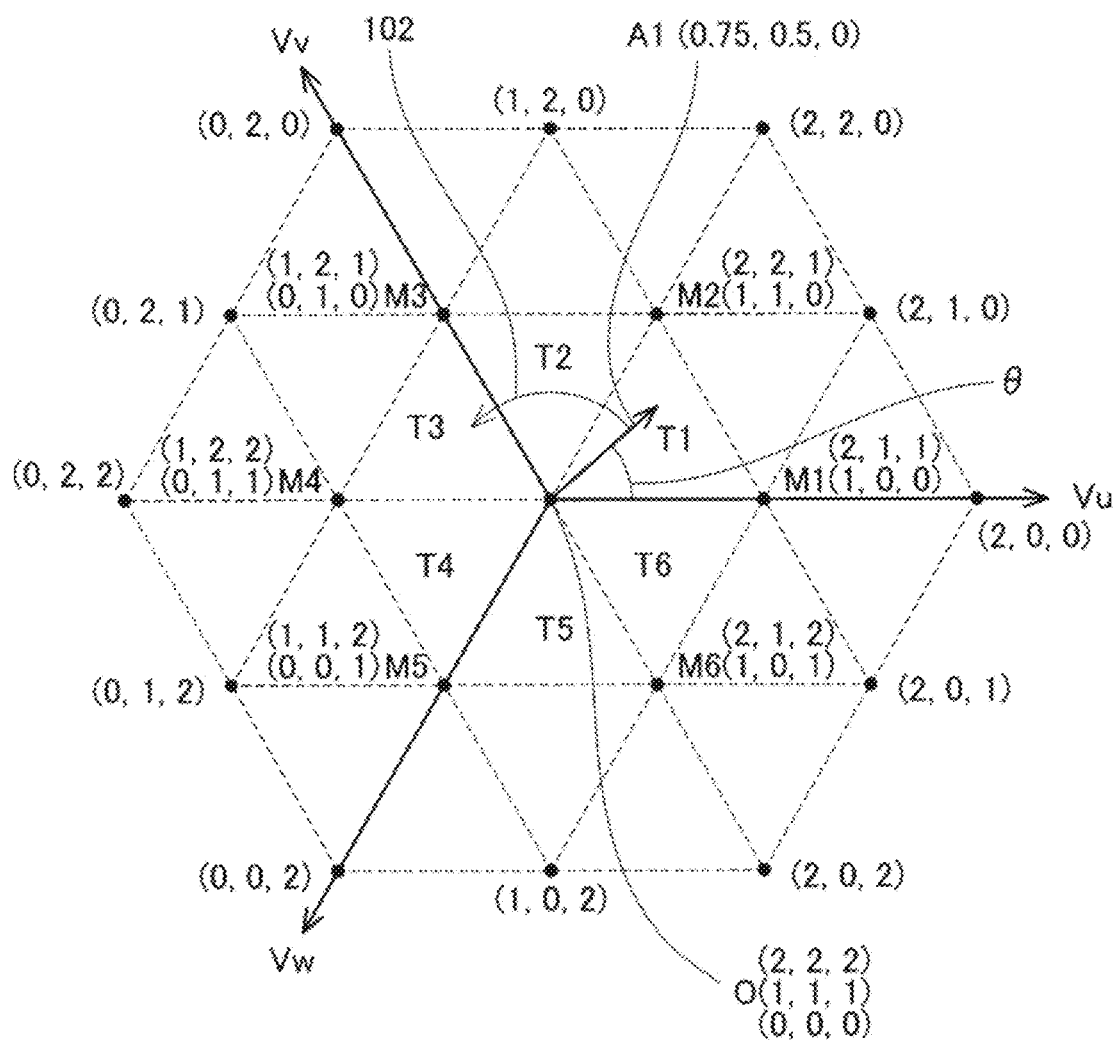
FIG. 3 is a diagram showing a spatial vector coordinate system.

FIG. 3 shows a spatial vector coordinate system representing the electric potentials applied to the output wirings 60. In FIG. 3, a voltage vector A1 is illustrated. The spatial vector coordinate system has nineteen coordinate points. Each coordinate point is represented by coordinates (Vu, Vv, Vw), i.e., the combination of three parameters Vu, Vv and Vw. The parameter Vu indicates the electric potential of the U-phase output wiring 60$u$. The parameter Vv indicates the electric potential of the V-phase output wiring 60$v$. The parameter Vw indicates the electric potential of the W-phase output wiring 60$w$. The parameters Vu, Vv and Vw take numerical values between 0 and 2. The numerical value 0 indicates that 0V is applied to the corresponding output wiring 60; the numerical value 1 indicates that the neutral-point potential VM is applied to the corresponding output wiring 60; and the numerical value 2 indicates that the electric potential VH is applied to the corresponding output wiring 60. For example, (2, 2, 0) indicates that: the electric potential VH is applied to the U-phase output wiring 60$u$; the electric potential VH is applied also to the V-phase output wiring 60$v$; and 0V is applied to the W-phase output wiring 60$w$.

The nineteen coordinate points of the spatial vector coordinate system include one origin O, twelve outermost coordinate points and sixth intermediate coordinate points M1 to M6. The origin O is a coordinate point which is located at the center of the spatial vector coordinate system. The origin O is represented by three sets of coordinates: (0, 0, 0), (1, 1, 1) and (2, 2, 2). That is, the origin O indicates that the U-phase output wiring 60$u$, the V-phase output wiring 60$v$ and the W-phase output wiring 60$w$ are set to the same electric potential. The outermost coordinate points are coordinate points which are located at an outermost periphery of the spatial vector coordinate system. In other words, the outermost coordinate points are coordinate points which are located on a hexagon constituting the outermost periphery of the spatial vector coordinate system. Moreover, each of the outermost coordinate points is represented by a single set of coordinates. The intermediate coordinate points M1 to M6 are coordinate points which are located between the origin O and the outermost coordinate points. In other words, the intermediate coordinate points are coordinate points which are located on a hexagon inside the outermost periphery of the spatial vector coordinate system. Each of the intermediate coordinate points is represented by two sets of coordinates. Specifically, each of the intermediate coordinate points is represented by: a set of upper coordinates where at least one of the parameters Vu, Vv and Vw is equal to 2 and the remainder is equal to 1; and a set of lower coordinates where at least one of the parameters Vu, Vv and Vw is equal to 1 and the remainder is equal to 0.

In the spatial vector coordinate system, there exist a plurality of triangular regions each of which has three vertices respectively constituted of three of the nineteen coordinate points described above. Specifically, at positions adjacent to the origin O, there exist six triangular regions T1 to T6. Hereinafter, the triangular regions T1 to T6 adjacent to the origin O will be referred to as the inner triangular regions. Each of the inner triangular regions T1 to T6 has three vertices respectively constituted of the origin O and two of the intermediate coordinate points M1 to M6. Moreover, on the outer peripheral side of the inner triangular regions T1 to T6, there exist eighteen triangular regions.

(Command Value Vector)

The command circuit 72 generates command values of electric potentials to be applied to the three output wirings 60. Specifically, the command circuit 72 generates the command values in the form of a voltage vector represented by coordinates (Vu, Vv, Vw) in the spatial vector coordinate system. Hereinafter, the voltage vector, which the command circuit 72 generates as the command values, will be referred to as a command value vector. The command circuit 72 generates the command value vector based on the rotational speed of the motor 90, electric current flowing through the motor 90 and the amount of operation of an accelerator by the vehicle driver. For example, the voltage vector A1 shown in FIG. 3 may be outputted as a command value vector. In addition, hereinafter, as shown in FIG. 3, the angle of a voltage vector will be represented by the angle θ thereof with respect to the Vu axis. The command circuit 72 successively generates command value vectors such that the angles θ of the command value vectors gradually increase. That is, the command circuit 72 successively generates command value vectors such that the command value vectors rotate as indicated by an arrow 102 in FIG. 3. The command value vectors are inputted to the control circuit 70. It should be noted that as will be described in detail later, the command circuit 72 may modify the command value vectors. Hereinafter, command value vectors before modification will be referred to as primary command value vectors; and command value vectors after modification will be referred to as secondary command value vectors.

(Normal Operation)

The control circuit 70 controls the inverter 10 based on command value vectors. When there is no short-circuited element in the inverter 10, the control circuit 70 performs a normal operation. In the normal operation, the control circuit 70 controls the inverter 10 according to primary command value vectors. For example, when the parameter Vu of a primary command value vector is equal to 0, the control circuit 70 controls the U-phase switching circuit 30u to be in the third state, thereby applying 0V to the U-phase output wiring 60u. When the parameter Vu of a primary command value vector is equal to 1, the control circuit 70 controls the U-phase switching circuit 30u to be in the second state, thereby applying the neutral-point potential VM to the U-phase output wiring 60u. When the parameter Vu of a primary command value vector is equal to 2, the control circuit 70 controls the U-phase switching circuit 30u to be in the first state, thereby applying the electric potential VH to the U-phase output wiring 60u. When the parameter Vv of a primary command value vector is equal to 0, the control circuit 70 controls the V-phase switching circuit 30v to be in the third state, thereby applying 0V to the V-phase output wiring 60v. When the parameter Vv of a primary command value vector is equal to 1, the control circuit 70 controls the V-phase switching circuit 30v to be in the second state, thereby applying the neutral-point potential VM to the V-phase output wiring 60v. When the parameter Vv of a primary command value vector is equal to 2, the control circuit 70 controls the V-phase switching circuit 30v to be in the first state, thereby applying the electric potential VH to the V-phase output wiring 60v. When the parameter Vw of a primary command value vector is equal to 0, the control circuit 70 controls the W-phase switching circuit 30w to be in the third state, thereby applying 0V to the W-phase output wiring 60w. When the parameter Vw of a primary command value vector is equal to 1, the control circuit 70 controls the W-phase switching circuit 30w to be in the second state, thereby applying the neutral-point potential VM to the W-phase output wiring 60w. When the parameter Vw of a primary command value vector is equal to 2, the control circuit 70 controls the W-phase switching circuit 30w to be in the first state, thereby applying the electric potential VH to the W-phase output wiring 60w.

Moreover, any parameter of a voltage vector may be expressed as a decimal fraction. For example, the coordinates of the voltage vector A1 shown in FIG. 3 are (0.75, 0.5, 0). When a command value vector is a voltage vector one or more parameters of which are expressed as decimal fractions as above, the control circuit 70 outputs, at staggered times, the coordinates of the vertices of the triangular region that includes the coordinates of the command value vector (i.e., the tip of the command value vector), thereby outputting the voltage vector corresponding to the command value vector. For example, when the voltage vector A1 is generated by the command circuit 72 as the command value vector, the control circuit 70 outputs, at staggered times, the coordinates of the three vertices of the triangular region T1 that includes the coordinates of the voltage vector A1 (i.e., the coordinates of the intermediate coordinate points M1 and M2 and the origin O). Consequently, the coordinates (0.75, 0.5, 0) of the voltage vector A1 are outputted. In addition, either (2, 1, 1) or (1, 0, 0) may be outputted as the coordinates of the intermediate coordinate point M1. Similarly, either (2, 2, 1) or (1, 1, 0) may be outputted as the coordinates of the intermediate coordinate point M2. On the other hand, any one of (0, 0, 0), (1, 1, 1) and (2, 2, 2) may be outputted as the coordinates of the origin. Moreover, in the case of outputting (0.75, 0.5, 0), the time proportions for which the coordinates of the three coordinate points are respectively outputted can be expressed by the following Equations 1.

$$\left.\begin{array}{l}T1 = 2k\sin\left(\frac{\pi}{3} - \theta\right) \\ T2 = 2k\sin(\theta) \\ T3 = 1 - Ta - Tb \\ k = \frac{\sqrt{3}}{2} \times Vmag/VH\end{array}\right\} \quad \text{(Equations 1)}$$

In above Equations 1, T1 is the time proportion for which the coordinates of the intermediate coordinate point M1 are outputted, T2 is the time proportion for which the coordinates of the intermediate coordinate point M2 are outputted, and T3 is the time proportion for which the coordinates of the origin O are outputted. Moreover, in above Equations 1, θ is the angle of a secondary command value vector with respect to the Vu axis, Vmag is a value obtained by converting the length of the secondary command value vector into voltage, and VH is the electric potential of the higher-potential wiring 12.

Figure 4:
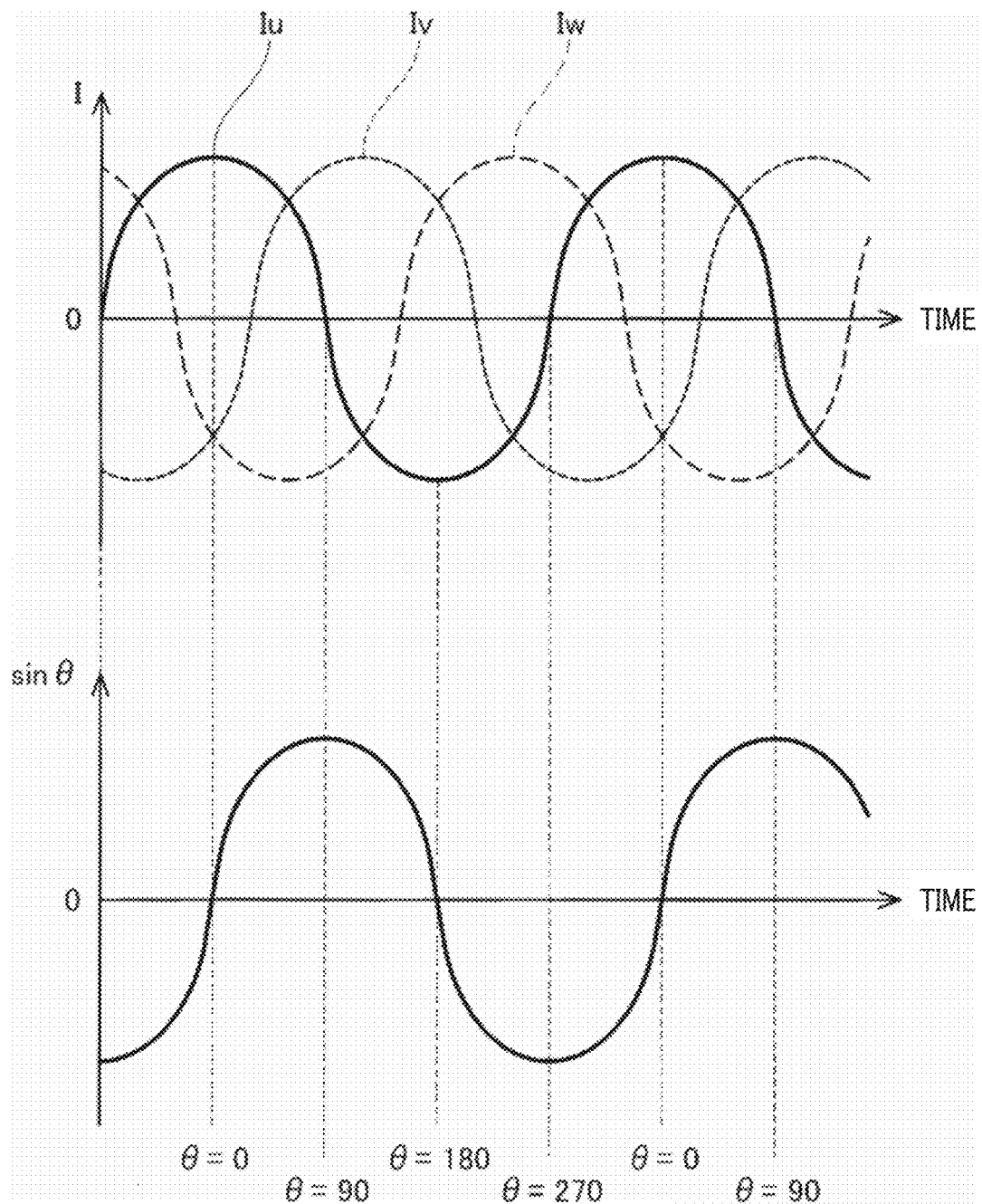
FIG. 4 is a graph illustrating the angles of output voltage vectors and three-phase alternating current.

As described above, the command circuit 72 successively generates primary command value vectors such that they rotate as indicated by the arrow 102 in FIG. 3, and inputs them to the control circuit 70. Then, the control circuit 70 outputs voltage vectors according to the inputted primary command value vectors. Consequently, the outputted voltage vectors rotate as indicated by the arrow 102 in FIG. 3. As a result, three-phase alternating current is generated between the three output wirings 60. FIG. 4 illustrates the relationship between electric currents Iu, Iv and Iw, which respectively flow through the three output wirings 60u, 60v and 60w, and the angles θ of the outputted voltage vectors. As shown in FIG. 4, the phase of the angles θ of the voltage vectors is shifted by substantially 90° from the phase of the electric current Iu. It should be noted that the phase difference between the angles θ and the electric current Iu may further change from that shown in FIG. 4, due to the influence of parasitic resistances of the circuits. Moreover, the phase difference between the angles θ and the electric current Iu may change in the case of changing the frequency of the three-phase alternating current. With the three-phase alternating current flowing through the output wirings 60u, 60v and 60w as shown in FIG. 4, the magnetic field generated in the motor 90 rotates. As a result, a rotor of the motor 90 rotates.

(Variation in Neutral-Point Potential VM)

Figure 5:
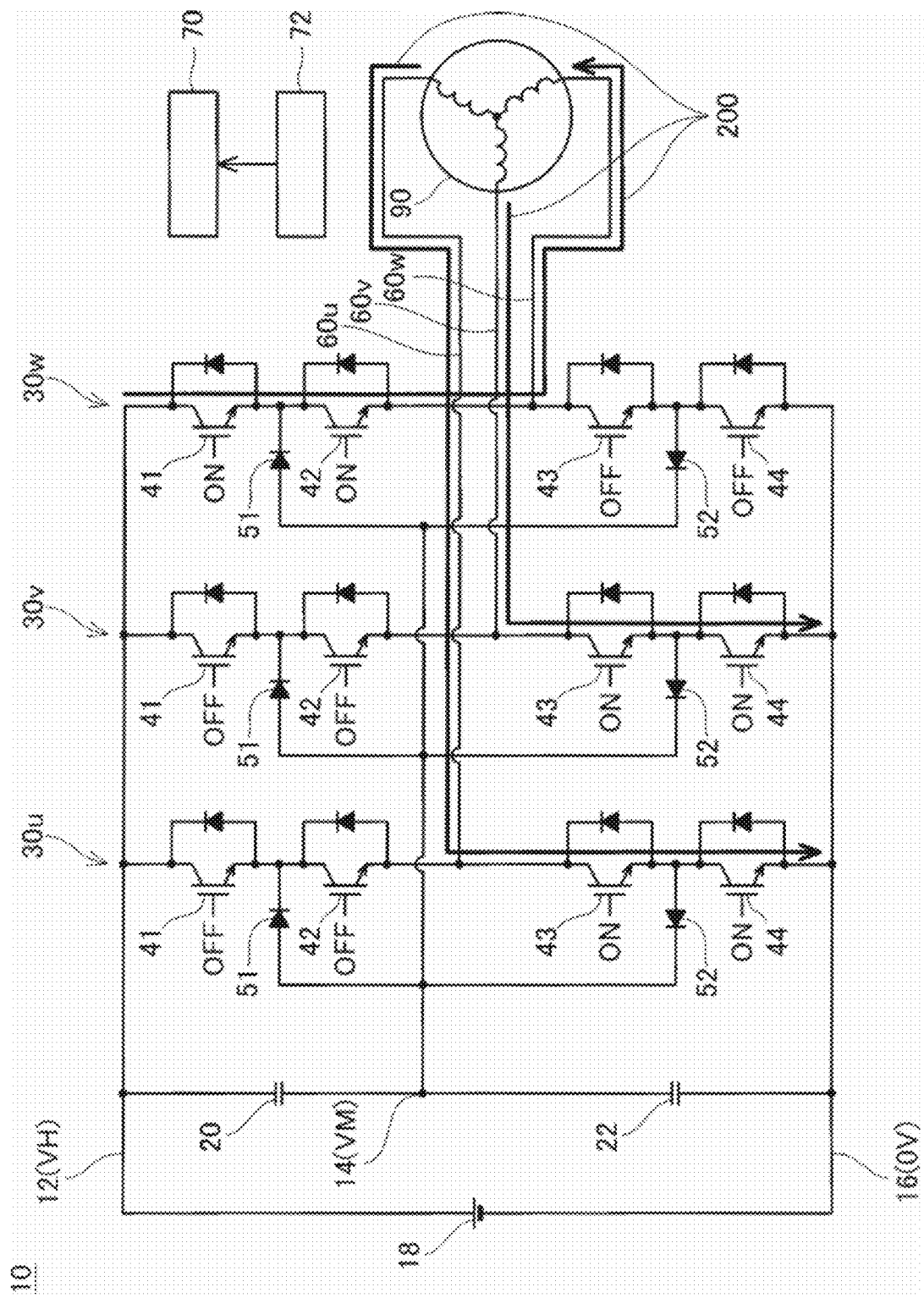
FIG. 5 is a circuit diagram illustrating an electric current path when (0, 0, 2) is outputted.

Next, variation in the neutral-point potential VM will be described. In cases of outputting those of the coordinate sets shown in FIG. 3 which do not include the numerical value 1 as a parameter, the neutral-point potential VM is not applied to any of the three output wirings 60. In these cases, no variation occurs in the neutral-point potential VM. For example, in the case where (0, 0, 2) is outputted, both the output wirings 60u and 60v are connected to the lower-potential wiring 16 and the output wiring 60w is connected to the higher-potential wiring 12, as shown in FIG. 5. Moreover, depending on the operating state of the motor 90, electric current may flow in the same direction as the voltage applied to the motor 90 (hereinafter, to be referred to as the forward direction) or in the opposite direction to the voltage applied to the motor 90 (hereinafter, to be referred to as the reverse direction). When electric current flows in the forward direction, it flows from the higher-potential wiring 12 to the motor 90 via the output wiring 60w, as indicated by arrows 200 in FIG. 5. Moreover, the electric current, which has flowed into the motor 90, further flows to the lower-potential wiring 16 via both the output wirings 60u and 60v. On the other hand, when electric current flows in the reverse direction, it flows in the opposite direction to the arrows 200. Consequently, in the case where (0, 0, 2) is outputted, no electric charge flows into the neutral point 14; and no electric charge flows out of the neutral point 14. As a result, no variation occurs in the neutral-point potential VM. Similarly, in cases where any of (2, 0, 0), (2, 2, 0), (0, 2, 0), (0, 2, 2) and (2, 0, 2) is outputted, no variation occurs in the neutral-point potential VM.

In cases of outputting those of the coordinate sets shown in FIG. 3 which include the numerical value 1 as a parameter, the neutral point 14 is connected to at least one of the three output wirings 60; thus, variation occurs in the neutral-point potential VM.

Figure 6:
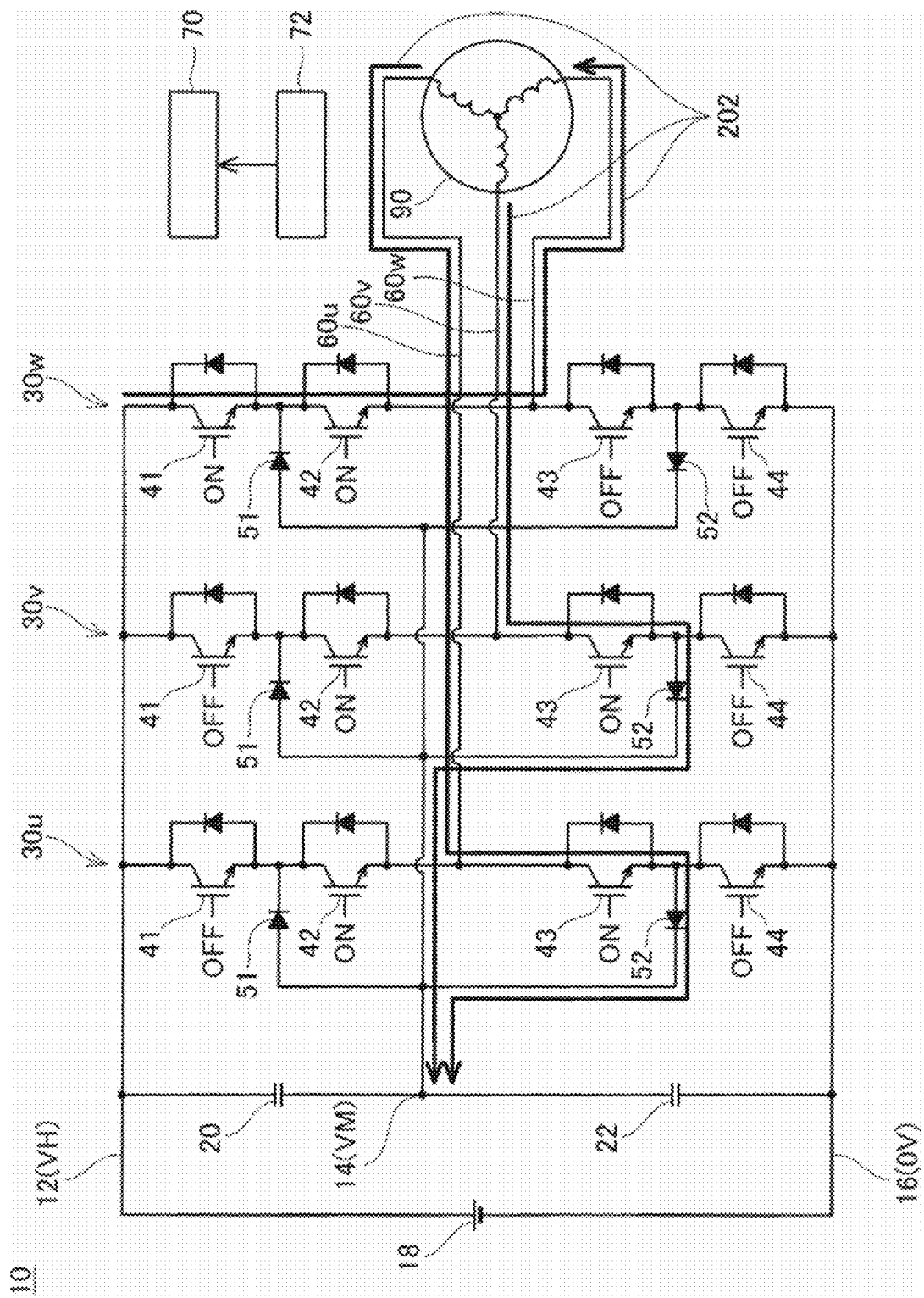
FIG. 6 is a circuit diagram illustrating an electric current path when (1, 1, 2) is outputted and electric current flows in a forward direction.
Figure 7:
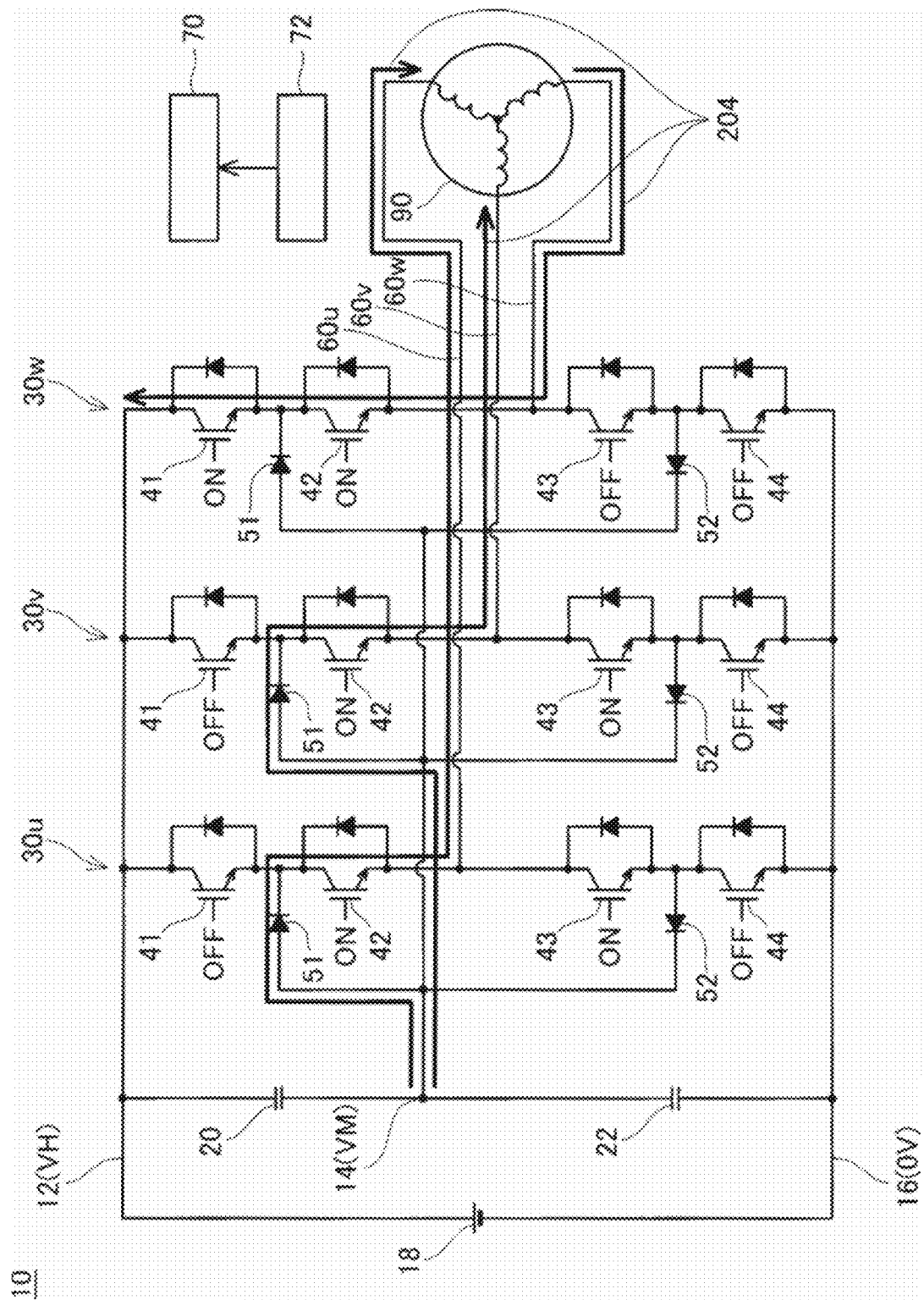
FIG. 7 is a circuit diagram illustrating an electric current path when (1, 1, 2) is outputted and electric current flows in a reverse direction.

For example, in the case where (1, 1, 2) is outputted, both the output wirings 60u and 60v are connected to the neutral point 14 and the output wiring 60w is connected to the higher-potential wiring 12, as shown in FIG. 6. In this case, when electric current flows in the forward direction, it flows from the higher-potential wiring 12 to the motor 90 via the output wiring 60w, as indicated by arrows 202 in FIG. 6. Moreover, the electric current, which has flowed into the motor 90, further flows to the neutral point 14 via both the output wirings 60u and 60v. Consequently, the upper capacitor 20 is discharged, causing the neutral-point potential VM to rise. On the other hand, when electric current flows in the reverse direction, it flows from the neutral point 14 to the motor 90 via both the output wirings 60u and 60v, as indicated by arrows 204 in FIG. 7. Moreover, the electric current, which has flowed into the motor 90, further flows to the higher-potential wiring 12 via the output wiring 60w. Consequently, the upper capacitor 20 is charged, causing the neutral-point potential VM to drop. As above, in the case where (1, 1, 2) is outputted, the neutral-point potential VM rises when the electric current flows in the forward direction, and drops when the electric current flows in the reverse direction. Similarly, in cases where any of (2, 1, 1), (2, 2, 1), (1, 2, 1), (1, 2, 2) and (2, 1, 2) is outputted, the neutral-point potential VM rises when the electric current flows in the forward direction, and drops when the electric current flows in the reverse direction.

Figure 8:
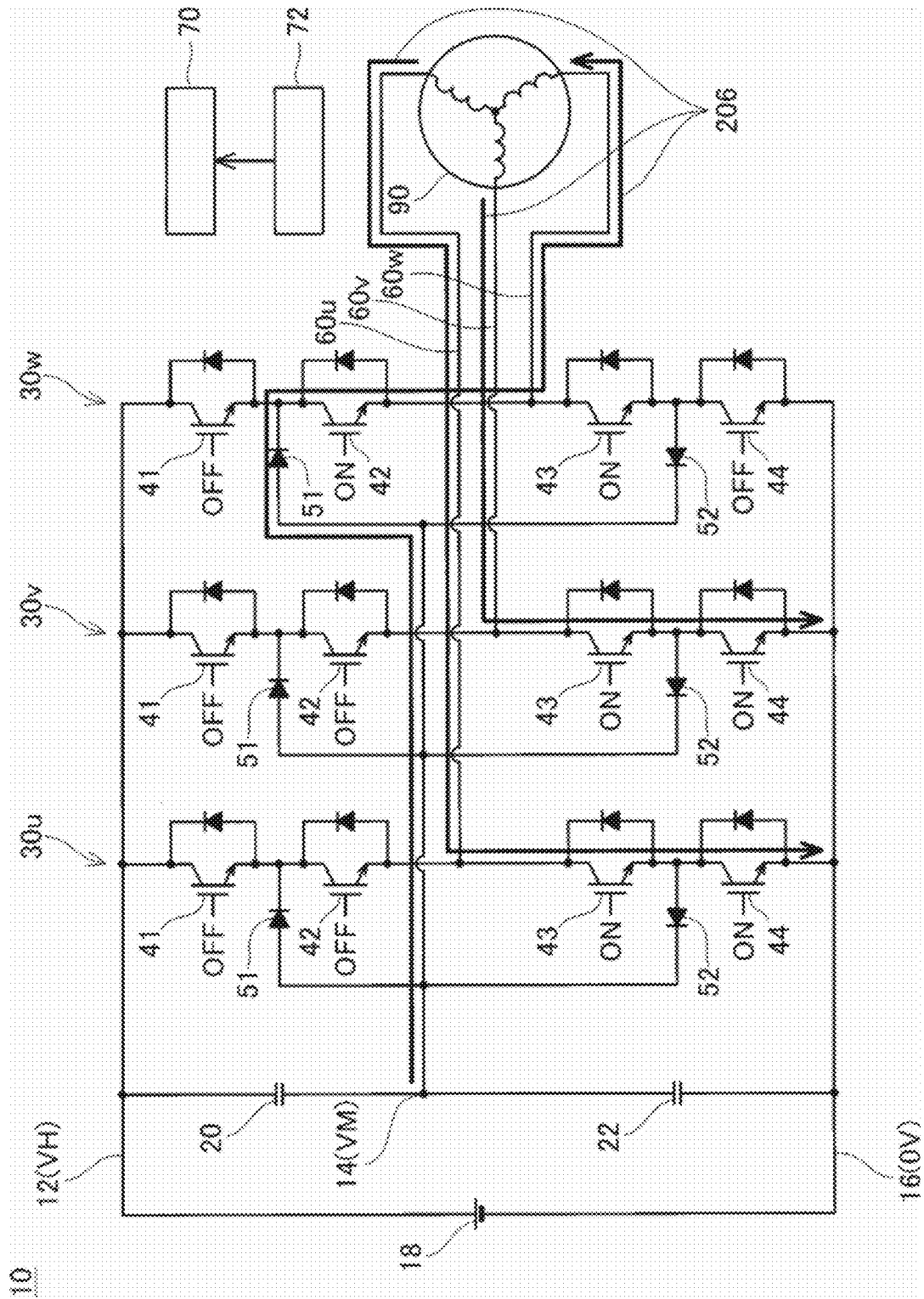
FIG. 8 is a circuit diagram illustrating an electric current path when (0, 0, 1) is outputted and electric current flows in the forward direction.
Figure 9:
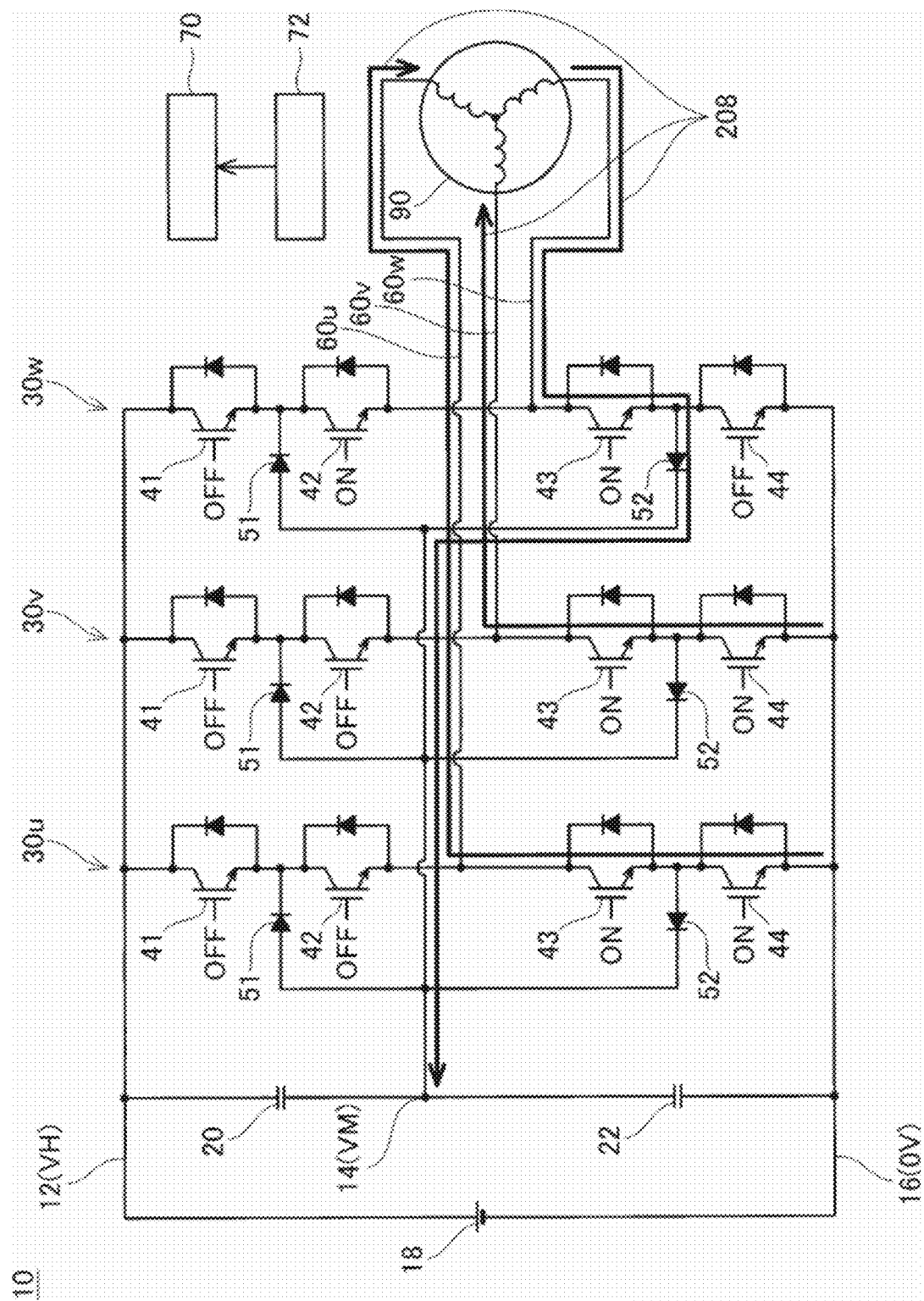
FIG. 9 is a circuit diagram illustrating an electric current path when (0, 0, 1) is outputted and electric current flows in the reverse direction.

For example, in the case where (0, 0, 1) is outputted, both the output wirings 60u and 60v are connected to the lower-potential wiring 16 and the output wiring 60w is connected to the neutral point 14, as shown in FIG. 8. In this case, when electric current flows in the forward direction, it flows from the neutral point 14 to the motor 90 via the output wiring 60w, as indicated by arrows 206 in FIG. 8. Moreover, the electric current, which has flowed into the motor 90, further flows to the lower-potential wiring 16 via both the output wirings 60u and 60v. Consequently, the lower capacitor 22 is discharged, causing the neutral-point potential VM to drop. On the other hand, when electric current flows in the reverse direction, it flows from the lower-potential wiring 16 to the motor 90 via both the output wirings 60u and 60v, as indicated by arrows 208 in FIG. 9. Moreover, the electric current, which has flowed into the motor 90, further flows to the neutral point 14 via the output wiring 60w. Consequently, the lower capacitor 22 is charged, causing the neutral-point potential VM to rise. As above, in the case where (0, 0, 1) is outputted, the neutral-point potential VM drops when the electric current flows in the forward direction, and rises when the electric current flows in the reverse direction. Similarly, in cases where any of (1, 0, 0), (1, 1, 0), (0, 1, 0), (0, 1, 1) and (1, 0, 1) is outputted, the neutral-point potential VM drops when the electric current flows in the forward direction, and rises when the electric current flows in the reverse direction.

Moreover, in cases where any of (2, 1, 0), (1, 2, 0), (0, 2, 1), (0, 1, 2), (1, 0, 2) and (2, 0, 1) among the coordinate sets shown in FIG. 3 is outputted, electric charge flows into or out of the neutral point 14, resulting in variation in the neutral-point potential VM.

In the normal operation, the command circuit 72 and the control circuit 70 change the output voltage vectors according to the neutral-point potential VM. For example, when the neutral-point potential VM becomes lower than a control target value, a voltage vector for raising the neutral-point potential VM is outputted preferentially. In contrast, when the neutral-point potential VM becomes higher than the control target value, a voltage vector for lowering the neutral-point potential VM is outputted preferentially. Consequently, it becomes possible to supply three-phase alternating current to the motor 90 while controlling the neutral-point potential VM to be close to the target value.

(Short-Circuited Element Determination Operation)

The control circuit 70 periodically performs a short-circuited element determination operation when the vehicle is not traveling. In the short-circuited element determination operation, the control circuit 70 determines, for each of the switching circuits 30$u$, 30$v$ and 30$w$, whether any of the switching elements 41 to 44 and the diodes 51 and 52 is short-circuited. In addition, a short-circuit fault of a switching element denotes a fault mode in which the switching element is kept in the ON state regardless of the electrical potential of the gate thereof. On the other hand, a short-circuit fault of a diode denotes a fault mode in which electric current is allowed to flow in either direction in the diode. The control circuit 70 selects one of the three switching circuits 30$u$, 30$v$ and 30$w$, and performs the short-circuited element determination operation on the selected switching circuit 30. Specifically, in the short-circuited element determination operation, the control circuit 70 turns on the switching elements in various combinations and measures electric current flowing in the selected switching circuit 30 at that time. In this way, the control circuit 70 determines whether there is a short-circuited element in the selected switching circuit 30; and when it is determined that there is a short-circuited element, the control circuit 70 further determines which of the switching elements 41 to 44 and the diodes 51 and 52 is the short-circuited element.

(A. Emergency Operation)

Next, an emergency operation will be described. The command circuit 72 and the control circuit 70 perform the emergency operation when it is necessary to drive the motor 90 in a state where there exists a short-circuited element in the inverter 10. Hereinafter, that one of the switching circuits 30 which includes the short-circuited element will be referred to as the restricted switching circuit 30$x$. Moreover, the output wiring 60 of the restricted switching circuit 30$x$ will be referred to as the restricted output wiring 60$x$. On the other hand, the switching circuits 30 other than the restricted switching circuit 30$x$ will be referred to as the normal switching circuits 30$y$. Moreover, the output wirings 60 of the normal switching circuits 30$y$ will be referred to as the normal output wirings 60$y$. The emergency operation is performed when there is one restricted switching circuit 30$x$ in the inverter 10 and there is one short-circuited element in the restricted switching circuit 30$x$. In the emergency operation, the restricted switching circuit 30$x$ is controlled so as to prevent a forbidden potential from being applied to the restricted output wiring 60$x$. First, the forbidden potential will be described.

(A-1. Forbidden Potential)

Figures 10, 11:
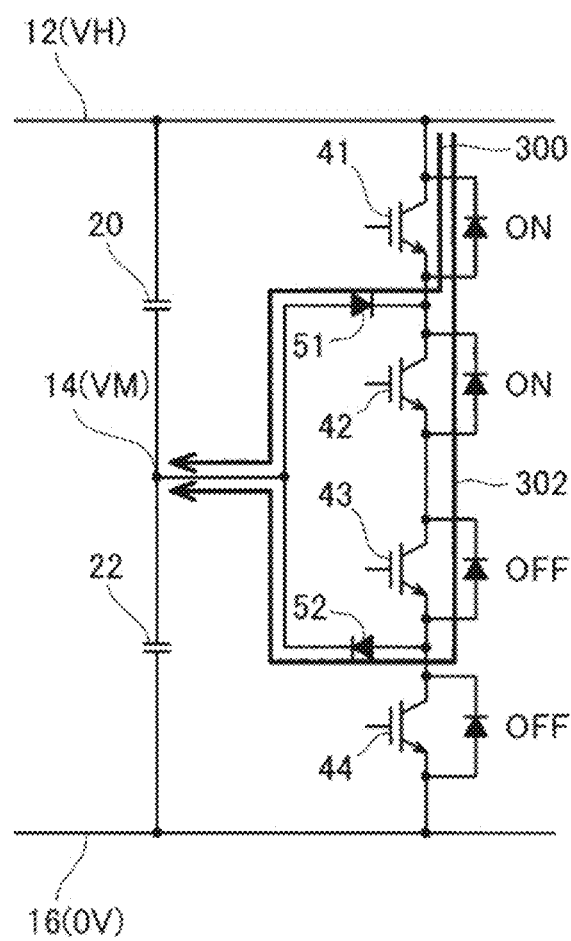
FIG. 10 is a tabular representation illustrating a forbidden potential.
FIG. 11 is a circuit diagram illustrating both a short-circuit current path when a first diode is short-circuited and a short-circuit current path when a third switching element is short-circuited.

The forbidden potential denotes a voltage that cannot be applied to the restricted output wiring 60$x$ because of occurrence of an inter-line short circuit in the restricted switching circuit 30$x$. FIG. 10 illustrates the relationship between the short-circuited element and the forbidden potential. The forbidden potential varies depending on the type of the short-circuited element in the restricted switching circuit 30$x$.

Figure 12:
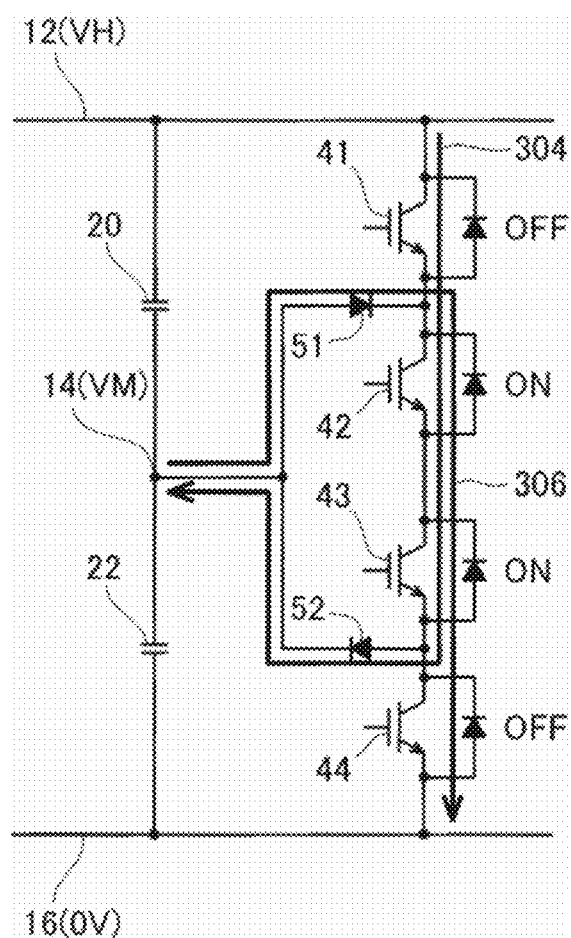
FIG. 12 is a circuit diagram illustrating both a short-circuit current path when a first switching element is short-circuited and a short-circuit current path when a fourth switching element is short-circuited.

As indicted by an arrow 304 in FIG. 12, when the first switching element 41 is short-circuited, an inter-line short circuit will occur between the higher-potential wiring 12 and the neutral point 14 in the second state. Therefore, when the first switching element 41 is short-circuited, the restricted switching circuit 30$x$ cannot be set to the second state; thus, the neutral-point potential VM cannot be applied to the restricted output wiring 60$x$. Accordingly, as shown in FIG. 10, when the first switching element 41 is short-circuited, the forbidden potential is the neutral-point potential VM.

Figure 13:
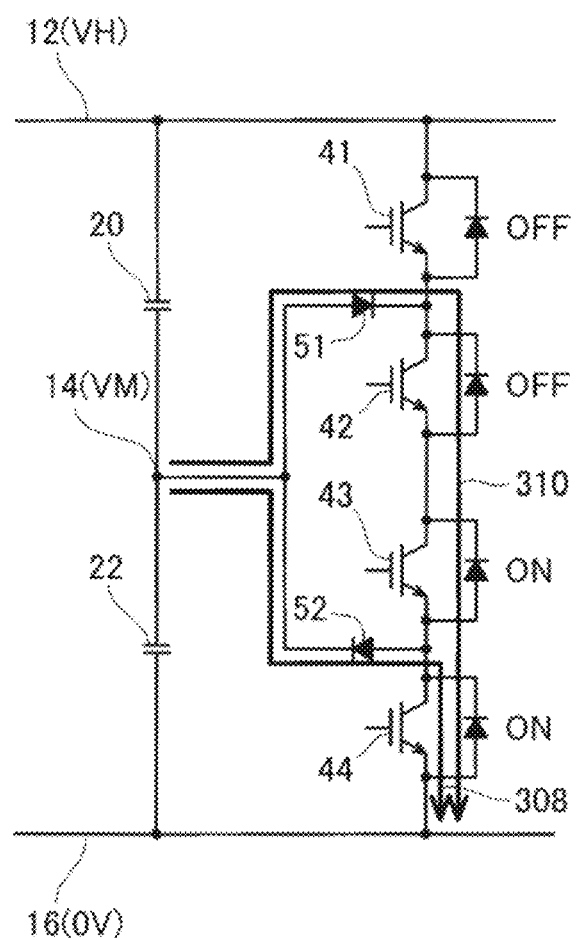
FIG. 13 is a circuit diagram illustrating both a short-circuit current path when a second diode is short-circuited and a short-circuit current path when a second switching element is short-circuited.

As indicated by an arrow 310 in FIG. 13, when the second switching element 42 is short-circuited, an inter-line short circuit will occur between the neutral point 14 and the lower-potential wiring 16 in the third state. Therefore, when the second switching element 42 is short-circuited, the restricted switching circuit 30$x$ cannot be set to the third state; thus, 0V cannot be applied to the restricted output wiring 60$x$. Accordingly, as shown in FIG. 10, when the second switching element 42 is short-circuited, the forbidden potential is 0V.

As indicated by an arrow 302 in FIG. 11, when the third switching element 43 is short-circuited, an inter-line short circuit will occur between the higher-potential wiring 12 and the neutral point 14 in the first state. Therefore, when the third switching element 43 is short-circuited, the restricted switching circuit 30$x$ cannot be set to the first state; thus, the electric potential VH cannot be applied to the restricted output wiring 60$x$. Accordingly, as shown in FIG. 10, when the third switching element 43 is short-circuited, the forbidden potential is the electric potential VH.

As indicated by an arrow 306 in FIG. 12, when the fourth switching element 44 is short-circuited, an inter-line short circuit will occur between the neutral point 14 and the lower-potential wiring 16 in the second state. Therefore, when the fourth switching element 44 is short-circuited, the restricted switching circuit 30$x$ cannot be set to the second state; thus, the neutral-point potential VM cannot be applied to the restricted output wiring 60$x$. Accordingly, as shown in FIG. 10, when the fourth switching element 44 is short-circuited, the forbidden potential is the neutral-point potential VM.

As indicated by an arrow 300 in FIG. 11, when the first diode 51 is short-circuited, an inter-line short circuit will occur between the higher-potential wiring 12 and the neutral point 14 in the first state. Therefore, when the first diode 51 is short-circuited, the restricted switching circuit 30$x$ cannot be set to the first state; thus, the electric potential VH cannot be applied to the restricted output wiring 60$x$. Accordingly, as shown in FIG. 10, when the first diode 51 is short-circuited, the forbidden potential is the electric potential VH.

As indicated by an arrow 308 in FIG. 13, when the second diode 52 is short-circuited, an inter-line short circuit will occur between the neutral point 14 and the lower-potential wiring 16 in the third state. Therefore, when the second diode 52 is short-circuited, the restricted switching circuit 30$x$ cannot be set to the third state; thus, 0V cannot be applied to the restricted output wiring 60$x$. Accordingly, as shown in FIG. 10, when the second diode 52 is short-circuited, the forbidden potential is 0V.

As described above, the forbidden potential that cannot be applied to the restricted output wiring 60x varies depending on the short-circuited element. Moreover, in the emergency operation, the control method varies depending on the forbidden potential.

(A-2. Emergency Operation when Forbidden Potential is Neutral-Point Potential VM)

When the forbidden potential is the neutral-point potential VM (i.e., when the short-circuited element is the first switching element 41 or the fourth switching element 44), the control circuit 70 controls the electric potentials outputted to the output wirings 60u, 60v and 60w at two levels, i.e., the higher potential VH and 0V In this operation, since the neutral-point potential VM is not applied to any of the three output wirings 60, three-phase alternating current can be continuously supplied to the motor 90 without being affected by the neutral-point potential VM. Consequently, it becomes possible to continuously power the vehicle to travel.

(A-3. Emergency Operation when Forbidden Potential is 0V or Higher Potential VH)

When the forbidden potential is 0V or the higher potential VH, the command circuit 72 generates a primary command value vector in the same manner as in the normal operation. Then, the command circuit 72 generates a secondary command value vector by modifying the primary command value vector.

Figure 14:
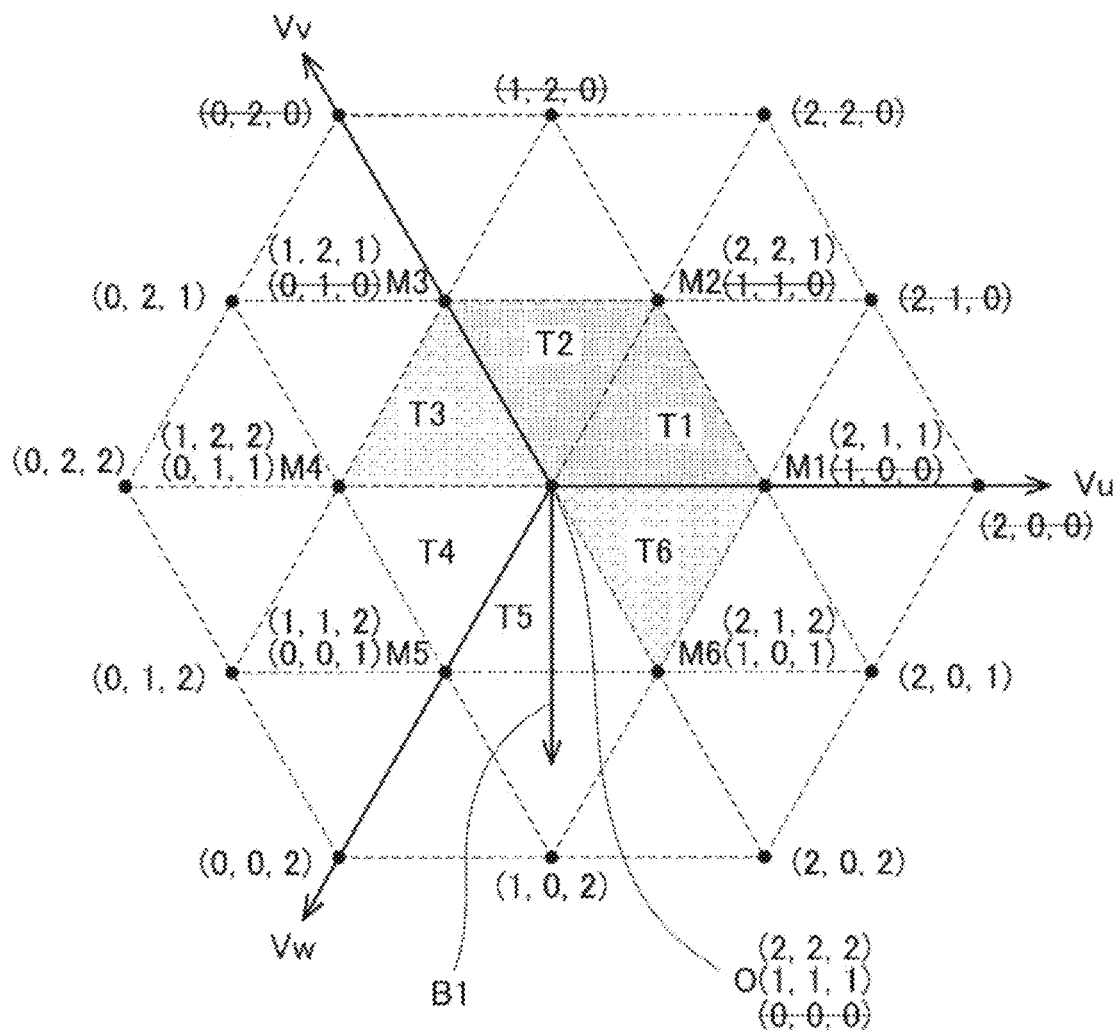
FIG. 14 is a diagram illustrating the spatial vector coordinate system where a primary command value vector belongs to an inner triangular region T5 that is a normal triangular region (in the case of a forbidden parameter being Vw=0).

As described above, at positions adjacent to the origin O, there exist six inner triangular regions T1 to T6. In the emergency operation, the command circuit 72 classifies the six inner triangular regions T1 to T6 into first restricted triangular regions, second restricted triangular regions and normal triangular regions. Moreover, the command circuit 72 determines whether the primary command value vector belongs to one of the first restricted triangular regions, one of the second restricted triangular regions or one of the normal triangular regions. Furthermore, the command circuit 72 generates the secondary command value vector depending on the determination result. Hereinafter, the first restricted triangular regions, the second restricted triangular regions and the normal triangular regions will be explained. As described above, in the emergency operation, the forbidden potential cannot be applied to the restricted output wiring 60x; therefore, some coordinate sets cannot be outputted. Specifically, those coordinate sets which include a parameter (hereinafter, to be referred to as the forbidden parameter) indicating application of the forbidden potential to the restricted output wiring 60x cannot be outputted. Hereinafter, those coordinate sets which include the forbidden parameter will be referred to as the forbidden coordinate sets; and those coordinate sets which do not include the forbidden parameter will be referred to as the normal coordinate sets. FIG. 14 illustrates a case where the restricted output wiring 60x is the output wiring 60w and the forbidden potential is 0V It should be noted that in each spatial vector diagram including FIG. 14, the forbidden coordinate sets are crossed out. In FIG. 14, the forbidden parameter is Vw=0; therefore, (2, 0, 0), (2, 1, 0), (2, 2, 0), (1, 2, 0), (0, 2, 0), (1, 0, 0), (1, 1, 0), (0, 1, 0) and (0, 0, 0) are the forbidden coordinate sets and the other coordinate sets are the normal coordinate sets. As described above, each of the intermediate coordinate points M1 to M6 has two sets of coordinates, i.e., the set of upper coordinates and the set of lower coordinates. Moreover, when there is one short-circuited element in the inverter 10, there are three intermediate coordinate points where one of the set of upper coordinates and the set of lower coordinates is a forbidden coordinate set. Hereinafter, those intermediate coordinate points where one of the set of upper coordinates and the set of lower coordinates is a forbidden coordinate set will be referred to as the restricted intermediate coordinate points; and those intermediate coordinate points where both the set of upper coordinates and the set of lower coordinates are normal coordinate sets will be referred to as the normal intermediate coordinate points. For example, in the case shown in FIG. 14, at each of the intermediate coordinate points M1 to M3, the set of lower coordinates (i.e., (1, 0, 0), (1, 1, 0), (0, 1, 0)) is a forbidden coordinate set whereas the set of upper coordinates (i.e., (2, 1, 1), (2, 2, 1), (1, 2, 1)) is a normal coordinate set. Therefore, in this case, the intermediate coordinate points M1 to M3 are the restricted intermediate coordinate points. Moreover, in the case shown in FIG. 14, the intermediate coordinate points M4 to M6 are the normal intermediate coordinate points. Each of the first restricted triangular regions is, among the inner triangular regions T1 to T6, an inner triangular region where both the intermediate coordinate points respectively constituting the two vertices other than the origin O are the restricted intermediate coordinate points. For example, in the case shown in FIG. 14, the inner triangular regions T1 and T2 are the first restricted triangular regions. Each of the second restricted triangular regions is, among the inner triangular regions T1 to T6, an inner triangular region where one of the two intermediate coordinate points respectively constituting the two vertices other than the origin O is a restricted intermediate coordinate point and the other of the two intermediate coordinate points is a normal intermediate coordinate point. For example, in the case shown in FIG. 14, the inner triangular regions T3 and T6 are the second restricted triangular regions. Each of the normal triangular regions is, among the inner triangular regions T1 to T6, an inner triangular region where both the intermediate coordinate points respectively constituting the two vertices other than the origin O are the normal intermediate coordinate points. For example, in the case shown in FIG. 14, the inner triangular regions T4 and T5 are the normal triangular regions. The two first restricted triangular regions T1 and T2 are adjacent to each other; and the two normal triangular regions T4 and T5 are adjacent to each other. The two second restricted triangular regions T3 and T6 are opposed to each other with the origin O interposed therebetween. In addition, each of the second restricted triangular regions is located between one of the first restricted triangular regions and one of the normal triangular regions.

The command circuit 72 determines to which of the inner triangular regions T1 to T6 the primary command value vector belongs. It should be noted that the inner triangular region to which the primary command value vector belongs denotes that one of the inner triangular regions T1 to T6 which includes at least part of the primary command value vector. More specifically, the inner triangular region to which the primary command value vector belongs denotes that one of the inner triangular regions T1 to T6 which includes a base end part of the primary command value vector. For example, the primary command value vector B1 shown in FIG. 14 belongs to the inner triangular region T5. Moreover, for example, the primary command value vector B2 shown in FIG. 15 belongs to the inner triangular region T1. The command circuit 72 determines whether the inner triangular region to which the primary command value vector belongs is one of the first restricted triangular regions, one of the second restricted triangular regions or one of the normal triangular regions. Depending on the determination result, the command circuit 72 and the control circuit 70 operate as follows.

(A-3-1. When Primary Command Value Vector Belongs to Normal Triangular Region)

When the primary command value vector belongs to one of the normal triangular regions, the command circuit 72 inputs the primary command value vector as it is to the control circuit 70. For example, in the case shown in FIG. 14, the primary command value vector B1 belongs to the inner triangular region T5 that is one of the normal triangular regions. In this case, the control circuit 70 outputs the voltage vector according to the primary command value vector, as in the normal operation. There is no forbidden coordinate set within the angular range of each of the normal triangular regions; therefore, when the primary command value vector belongs to one the normal triangular regions, no problem will occur even if the voltage vector is outputted in the same manner as in the normal operation. For example, the control circuit 70 may detect the neutral-point potential VM and select and output either the upper coordinates or the lower coordinates depending on the neutral-point potential VM. Specifically, when the neutral-point potential VM is higher than the target value (e.g., VH/2), the control circuit 70 may select and output, of the upper coordinates and the lower coordinates, the coordinates that lower the neutral-point potential VM. In contrast, when the neutral-point potential VM is lower than the target value (e.g., VH/2), the control circuit 70 may select and output, of the upper coordinates and the lower coordinates, the coordinates that raise the neutral-point potential VM.

(A-3-2. When Primary Command Value Vector Belongs to First Restricted Triangular Region)

When the primary command value vector belongs to one of the first restricted triangular regions, the command circuit 72 identifies the second restricted triangular region that is adjacent to the first restricted triangular region (hereinafter, to be referred to as the specific first restricted triangular region) to which the primary command value vector belongs. Hereinafter, the second restricted triangular region that is adjacent to the specific first restricted triangular region will be referred to as the adjacent second restricted triangular region. For example, in the case shown in FIG. 15, the primary command value vector B2 belongs to the inner triangular region T1 (i.e., one of the first restricted triangular regions). Therefore, the specific first restricted triangular region is the inner triangular region T1. In this case, the command circuit 72 identifies the inner triangular region T6, which is the second restricted triangular region adjacent to the inner triangular region T1, as the adjacent second restricted triangular region. Next, the command circuit 72 identifies the two intermediate coordinate points that form the diagonal, which does not include the origin O, of a quadrangle formed by the specific first restricted triangular region and the adjacent second restricted triangular region. Hereinafter, of the two identified intermediate coordinate points (i.e., the two intermediate coordinate points forming the diagonal that does not include the origin O), the intermediate coordinate point within the specific first restricted triangular region will be referred to as the first intermediate coordinate point; and the intermediate coordinate point within the adjacent second restricted triangular region will be referred to as the second intermediate coordinate point. The first intermediate coordinate point is one of the restricted intermediate coordinate points, whereas the second intermediate coordinate point is one of the normal intermediate coordinate points. For example, in the case shown in FIG. 15, the two intermediate coordinate points that form the diagonal, which does not include the origin O, of the quadrangle formed by the two inner triangular regions T1 and T6 are the intermediate coordinate point M2 and the intermediate coordinate point M6. The intermediate coordinate point M2 is a coordinate point that constitutes one of the vertices of the specific first restricted triangular region (i.e., the inner triangular region T1), and is therefore the first intermediate coordinate point. The intermediate coordinate point M6 is a coordinate point that constitutes one of the vertices of the adjacent second restricted triangular region (i.e., the inner triangular region T6), and is therefore the second intermediate coordinate point. The intermediate coordinate point M2 (i.e., the first intermediate coordinate point) is one of the restricted intermediate coordinate points, whereas the intermediate coordinate point M6 (i.e., the second intermediate coordinate point) is one of the normal intermediate coordinate points. Next, the command circuit 72 calculates the line segment (hereinafter, to be referred to as the line segment L1) that connects the first intermediate coordinate point and the second intermediate coordinate point. For example, in the case shown in FIG. 15, the command circuit 72 calculates the line segment L1 that connects the intermediate coordinate point M2 (i.e., the first intermediate coordinate point) and the intermediate coordinate point M6 (i.e., the second intermediate coordinate point). Then, the command circuit 72 determines whether the primary command value vector exceeds the line segment L1. When it is determined that the primary command value vector exceeds the line segment L1, the command circuit 72 calculates a voltage vector, which has the same angle θ as the primary command value vector and a length not exceeding the line segment L1, as a secondary command value vector. That is, the command circuit 72 calculates the secondary command value vector by shortening the primary command value vector. For example, in the case shown in FIG. 15, the primary command value vector B2 exceeds the line segment L1 (i.e., extends to the outer peripheral side of the line segment L1). Therefore, the command circuit 72 calculates the secondary command value vector C2 that has the same angle θ as the primary command value vector B2 and does not exceed the line segment L1. In contrast, when it is determined that the primary command value vector does not exceed the line segment L1, the command circuit 72 directly uses the primary command value vector as a secondary command value vector. The generated secondary command value vector is then inputted to the control circuit 70.

The control circuit 70 outputs a voltage vector according to the secondary command value vector. Specifically, the control circuit 70 outputs a voltage vector substantially coinciding with the secondary command value vector by outputting, at staggered times, the coordinates of the first intermediate coordinate point, the coordinates of the second intermediate coordinate point and the coordinates of the origin O. Since the first intermediate coordinate point is a restricted intermediate coordinate point, one of the set of upper coordinates and the set of lower coordinates representing the first intermediate coordinate point is a forbidden coordinate set. Therefore, the control circuit 70 outputs, as the coordinates of the first intermediate coordinate point, that one of the set of upper coordinates and the set of lower coordinates which is a normal coordinate set. On the other hand, since the second intermediate coordinate point is a normal intermediate coordinate point, both the set of upper coordinates and the set of lower coordinates representing the second intermediate coordinate point are normal coordinate sets. The control circuit 70 outputs, as the coordinates of the second intermediate coordinate point, the set of coordinates on the opposite side to the set of coordinates outputted as the coordinates of the first intermediate coordinate point. That is, in the case of outputting the set of upper coordinates of the first intermediate coordinate point as the coordinates of the first intermediate coordinate point, the control circuit 70 outputs the set of lower coordinates of the second intermediate coordinate point as the coordinates of the second intermediate coordinate point. In contrast, in the case of outputting the set of lower coordinates of the first intermediate coordinate point as the coordinates of the first intermediate coordinate point, the control circuit 70 outputs the set of upper coordinates of the second intermediate coordinate point as the coordinates of the second intermediate coordinate point. Moreover, the control circuit 70 outputs, as the coordinates of the origin O, any one of the sets of coordinates of the origin O which is not a forbidden coordinate set. For example, in the case of outputting the secondary command value vector C2 shown in FIG. 15, (2, 2, 1) is outputted as the coordinates of the first intermediate coordinate point; (1, 0, 1) is outputted as the coordinates of the second intermediate coordinate point; and either (2, 2, 2) or (1, 1, 1) is outputted as the coordinates of the origin O. In this case, the time proportions for which the coordinates of the coordinate points are respectively outputted can be expressed by the following Equations 2.

$$\left.\begin{array}{l} Ta = 2k\sin\left(\dfrac{2\pi}{3} - \omega\right) \\ Tb = 2k\sin(\omega) \\ Tc = 1 - Ta - Tb \\ k = \dfrac{\sqrt{3}}{2} \times Vmag\Big/\left(\dfrac{VH}{2}\right) \end{array}\right\}$$ (Equations 2)

In above Equations 2, Ta is the time proportion for which the coordinates of the first intermediate coordinate point are outputted, Tb is the time proportion for which the coordinates of the second intermediate coordinate point are outputted, and Tc is the time proportion for which the coordinates of the origin O are outputted. Moreover, in above Equations 2, ω is the angle of the secondary command value vector with respect to the direction of (2, 0, 2), Vmag is a value obtained by converting the length of the secondary command value vector into voltage, and VH is the electric potential of the higher-potential wiring 12.

As described above, in the case of outputting a voltage vector belonging to one of the first restricted triangular regions, the inverter 10 identifies the quadrangle formed by the specific first restricted triangular region and the adjacent second restricted triangular region; then, the inverter 10 further identifies the first intermediate coordinate point and the second intermediate coordinate point that form the diagonal of the quadrangle which does not include the origin O. Thereafter, the inverter 10 outputs the voltage vector belonging to the first restricted triangular region by outputting, at staggered times, the coordinates of the first intermediate coordinate point, the coordinates of the second intermediate coordinate point and the coordinates of the origin O. According to this method, since the second intermediate coordinate point is a normal intermediate coordinate point, it is possible to select, as the coordinates of the second intermediate coordinate point to be outputted, those coordinates which are on the opposite side to the coordinates of the first intermediate coordinate point to be outputted. Thus, in the case of outputting the upper coordinates of the first intermediate coordinate point as the coordinates of the first intermediate coordinate point, it is possible to output the lower coordinates of the second intermediate coordinate point as the coordinates of the second intermediate coordinate point; in the case of outputting the lower coordinates of the first intermediate coordinate point as the coordinates of the first intermediate coordinate point, it is possible to output the upper coordinates of the second intermediate coordinate point as the coordinates of the second intermediate coordinate point. Consequently, it is possible to prevent that the upper coordinates of the first and second intermediate coordinate points or the lower coordinates of the first and second intermediate coordinate points be continuously outputted. Hence, with the inverter 10 according to the first embodiment, it is possible to suppress variation in the neutral-point potential VM during the emergency operation.

Figure 15:
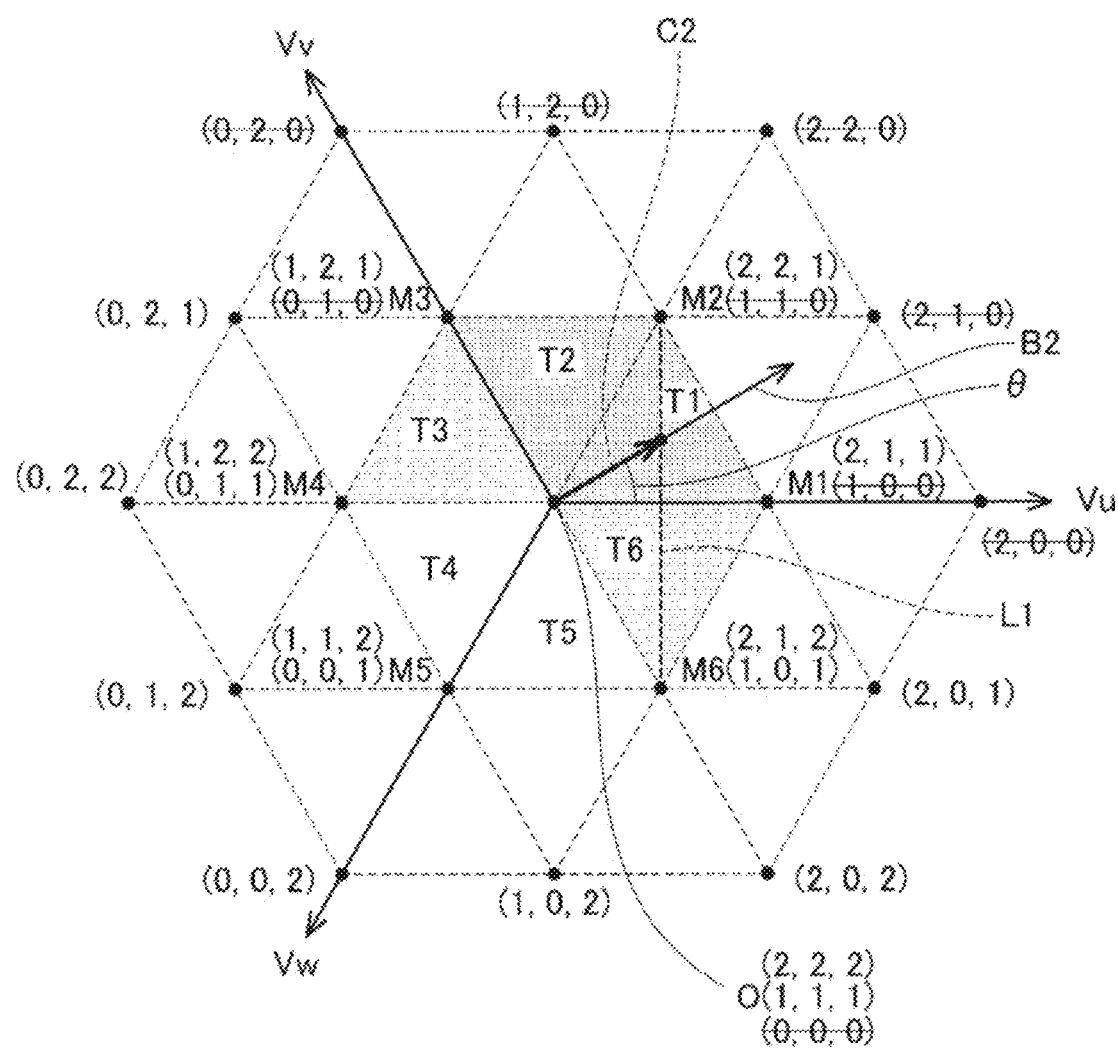
FIG. 15 is a diagram illustrating the spatial vector coordinate system where a primary command value vector belongs to an inner triangular region T1 that is a first restricted triangular region (in the case of the forbidden parameter being Vw=0).

More specifically, in the normal operation, in the case of outputting a voltage vector having coordinates within the inner triangular region T1, such as the command value vector C2 shown in FIG. 15, the coordinates of the three coordinate points (i.e., the intermediate coordinate point M1, the intermediate coordinate point M2 and the origin O) constituting the three vertices of the inner triangular region T1 are outputted as staggered times. In the emergency operation, if the same control as in the normal operation is performed, variation will occur in the neutral-point potential VM. For example, in the case shown in FIG. 15 where both the sets of lower coordinates of the intermediate coordinate points M1 and M2 are forbidden coordinate sets, only the sets of upper coordinates of the intermediate coordinate points M1 and M2 can be outputted as the coordinates of the intermediate coordinate points M1 and M2. As described above, the output of the upper coordinates causes the neutral-point potential VM to rise or drop. Therefore, if the upper coordinates of the intermediate coordinate point M1, the upper coordinates of the intermediate coordinate point M2 and the coordinates of the origin O are outputted at staggered times, the upper coordinates will be disproportionately outputted, causing the neutral-point potential VM to vary considerably. For example, at an operation timing when the output of the upper coordinates will cause the neutral-point potential VM to rise, if the upper coordinates are disproportionately outputted, the neutral-point potential VM will rise considerably. Moreover, for example, at an operation timing when the output of the upper coordinates will cause the neutral-point potential VM to drop, if the upper coordinates are disproportionately outputted, the neutral-point potential VM will drop considerably. In contrast, in the control method according to the present embodiment, the intermediate coordinate point M6, which is a normal intermediate coordinate point, is selected instead of the intermediate coordinate point M1; and the lower coordinates of the intermediate coordinate point M6 are outputted as the coordinates of the intermediate coordinate point M6. That is, the upper coordinates of the intermediate coordinate point M1, the lower coordinates of the intermediate coordinate point M6 and the coordinates of the origin O are outputted at staggered times. Consequently, the upper coordinates are prevented from being disproportionately outputted. As a result, it becomes possible to suppress variation in the neutral-point potential VM.

Moreover, when the control circuit 70 outputs the coordinates of the first intermediate coordinate point, the coordinates of the second intermediate coordinate point and the coordinates of the origin O at staggered times, it is impossible to output a voltage vector exceeding the line segment L1. Therefore, in the inverter 10, when the primary command value vector exceeds the line segment L1, the command circuit 72 calculates the secondary command value vector that does not exceed the line segment L1. Then, the control circuit 70 outputs the voltage vector according to the secondary command value vector. Consequently, it becomes possible to output the voltage vector at a proper angle.

Figure 16:
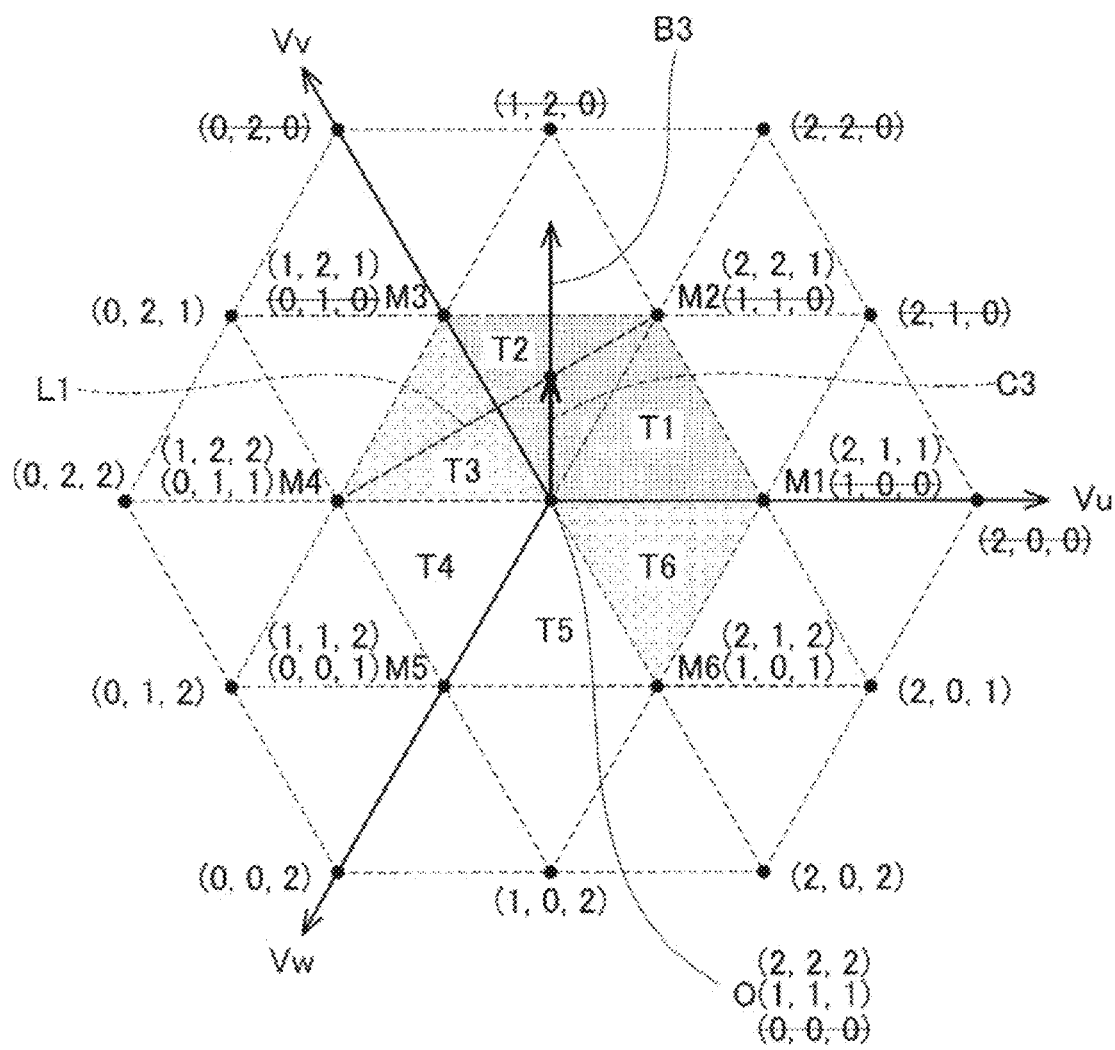
FIG. 16 is a diagram illustrating the spatial vector coordinate system where a primary command value vector belongs to an inner triangular region T2 that is another first restricted triangular region (in the case of the forbidden parameter being Vw=0).

FIG. 16 illustrates a primary command value vector B3 that belongs to the inner triangular region T2 (i.e., one of the first restricted triangular regions). In this case, the specific first restricted triangular region is the inner triangular region T2; the adjacent second restricted triangular region is the inner triangular region T3; the first intermediate coordinate point is the intermediate coordinate point M2; and the second intermediate coordinate point is the intermediate coordinate point M4. The command circuit 72 generates a secondary command value vector C3. The control circuit 70 outputs the upper coordinates of the intermediate coordinate point M2, the lower coordinates of the intermediate coordinate point M4 and the coordinates of the origin O at staggered times. In the case shown in FIG. 16, variation in the neutral-point potential VM can be suppressed as in the case shown in FIG. 15.

(A-3-3. When Primary Command Value Vector Belongs to Second Restricted Triangular Region)

When the primary command value vector belongs to one of the second restricted triangular regions, the command circuit 72 identifies the first restricted triangular region that is adjacent to the second restricted triangular region (hereinafter, to be referred to as the specific second restricted triangular region) to which the primary command value vector belongs. Hereinafter, the first restricted triangular region that is adjacent to the specific second restricted triangular region will be referred to as the adjacent first restricted triangular region. For example, in the case shown in FIG. 17, the primary command value vector B4 belongs to the inner triangular region T6 (i.e., one of the second restricted triangular regions). Therefore, the specific second restricted triangular region is the inner triangular region T6. In this case, the command circuit 72 identifies the inner triangular region T1, which is the first restricted triangular region adjacent to the inner triangular region T6, as the adjacent first restricted triangular region. Next, the command circuit 72 identifies the two intermediate coordinate points that form the diagonal, which does not include the origin O, of a quadrangle formed by the specific second restricted triangular region and the adjacent first restricted triangular region. Hereinafter, of the two identified intermediate coordinate points (i.e., the two intermediate coordinate points forming the diagonal that does not include the origin O), the intermediate coordinate point within the adjacent first restricted triangular region will be referred to as the third intermediate coordinate point; and the intermediate coordinate point within the specific second restricted triangular region will be referred to as the fourth intermediate coordinate point. The third intermediate coordinate point is one of the restricted intermediate coordinate points, whereas the fourth intermediate coordinate point is one of the normal intermediate coordinate points. For example, in the case shown in FIG. 17, the two intermediate coordinate points that form the diagonal, which does not include the origin O, of the quadrangle formed by the two inner triangular regions T1 and T6 are the intermediate coordinate point M2 and the intermediate coordinate point M6. The intermediate coordinate point M2 is a coordinate point that constitutes one of the vertices of the adjacent first restricted triangular region (i.e., the inner triangular region T1), and is therefore the third intermediate coordinate point. The intermediate coordinate point M6 is a coordinate point that constitutes one of the vertices of the specific second restricted triangular region (i.e., the inner triangular region T6), and is therefore the fourth intermediate coordinate point. The intermediate coordinate point M2 (i.e., the third intermediate coordinate point) is one of the restricted intermediate coordinate points, whereas the intermediate coordinate point M6 (i.e., the fourth intermediate coordinate point) is one of the normal intermediate coordinate points. Next, the command circuit 72 calculates the line segment (hereinafter, to be referred to as the line segment L2) that connects the third intermediate coordinate point and the fourth intermediate coordinate point. For example, in the case shown in FIG. 17, the command circuit 72 calculates the line segment L2 that connects the intermediate coordinate point M2 (i.e., the third intermediate coordinate point) and the intermediate coordinate point M6 (i.e., the fourth intermediate coordinate point). Then, the command circuit 72 determines whether the primary command value vector exceeds the line segment L2. When it is determined that the primary command value vector exceeds the line segment L2, the command circuit 72 calculates a voltage vector, which has the same angle $\theta$ as the primary command value vector and a length not exceeding the line segment L2, as a secondary command value vector. That is, the command circuit 72 calculates the secondary command value vector by shortening the primary command value vector. For example, in the case shown in FIG. 17, the primary command value vector B4 exceeds the line segment L2 (i.e., extends to the outer peripheral side of the line segment L2). Therefore, the command circuit 72 calculates the secondary command value vector C4 that has the same angle $\theta$ as the primary command value vector B4 and does not exceed the line segment L2. In contrast, when it is determined that the primary command value vector does not exceed the line segment L2, the command circuit 72 directly uses the primary command value vector as a secondary command value vector. The generated secondary command value vector is then inputted to the control circuit 70.

The control circuit 70 outputs a voltage vector according to the secondary command value vector. Specifically, the control circuit 70 outputs a voltage vector substantially coinciding with the secondary command value vector by outputting, at staggered times, the coordinates of the third intermediate coordinate point, the coordinates of the fourth intermediate coordinate point and the coordinates of the origin O. Since the third intermediate coordinate point is a restricted intermediate coordinate point, one of the set of upper coordinates and the set of lower coordinates representing the third intermediate coordinate point is a forbidden coordinate set. Therefore, the control circuit 70 outputs, as the coordinates of the third intermediate coordinate point, that one of the set of upper coordinates and the set of lower coordinates which is a normal coordinate set. On the other hand, since the fourth intermediate coordinate point is a normal intermediate coordinate point, both the set of upper coordinates and the set of lower coordinates representing the fourth intermediate coordinate point are normal coordinate sets. The control circuit 70 outputs, as the coordinates of the fourth intermediate coordinate point, the set of coordinates on the opposite side to the set of coordinates outputted as the coordinates of the third intermediate coordinate point. That is, in the case of outputting the set of upper coordinates of the third intermediate coordinate point as the coordinates of the third intermediate coordinate point, the control circuit 70 outputs the set of lower coordinates of the fourth intermediate coordinate point as the coordinates of the fourth intermediate coordinate point. In contrast, in the case of outputting the set of lower coordinates of the third intermediate coordinate point as the coordinates of the third intermediate coordinate point, the control circuit 70 outputs the set of upper coordinates of the fourth intermediate coordinate point as the coordinates of the fourth intermediate coordinate point. Moreover, the control circuit 70 outputs, as the coordinates of the origin O, any one of the sets of coordinates of the origin O which is not a forbidden coordinate set. For example, in the case of outputting the secondary command value vector C4 shown in FIG. 17, (2, 2, 1) is outputted as the coordinates of the third intermediate coordinate point; (1, 0, 1) is outputted as the coordinates of the fourth intermediate coordinate point; and either (2, 2, 2) or (1, 1, 1) is outputted as the coordinates of the origin O. In this case, the time proportions for which the coordinates of the coordinate points are respectively outputted can be expressed by the following Equations 3.

$$\left.\begin{array}{l} Td = 2k\sin\left(\dfrac{2\pi}{3} - \omega\right) \\ Te = 2k\sin(\omega) \\ Tf = 1 - Ta - Tb \\ k = \dfrac{\sqrt{3}}{2} \times Vmag/\left(\dfrac{VH}{2}\right) \end{array}\right\}$$ (Equations 3)

In above Equations 3, Td is the time proportion for which the coordinates of the third intermediate coordinate point are outputted, Te is the time proportion for which the coordinates of the fourth intermediate coordinate point are outputted, and Tf is the time proportion for which the coordinates of the origin O are outputted. Moreover, in above Equations 3, w is the angle of the secondary command value vector with respect to the direction of (2, 0, 2), Vmag is a value obtained by converting the length of the secondary command value vector into voltage, and VH is the electric potential of the higher-potential wiring 12.

Figure 17:
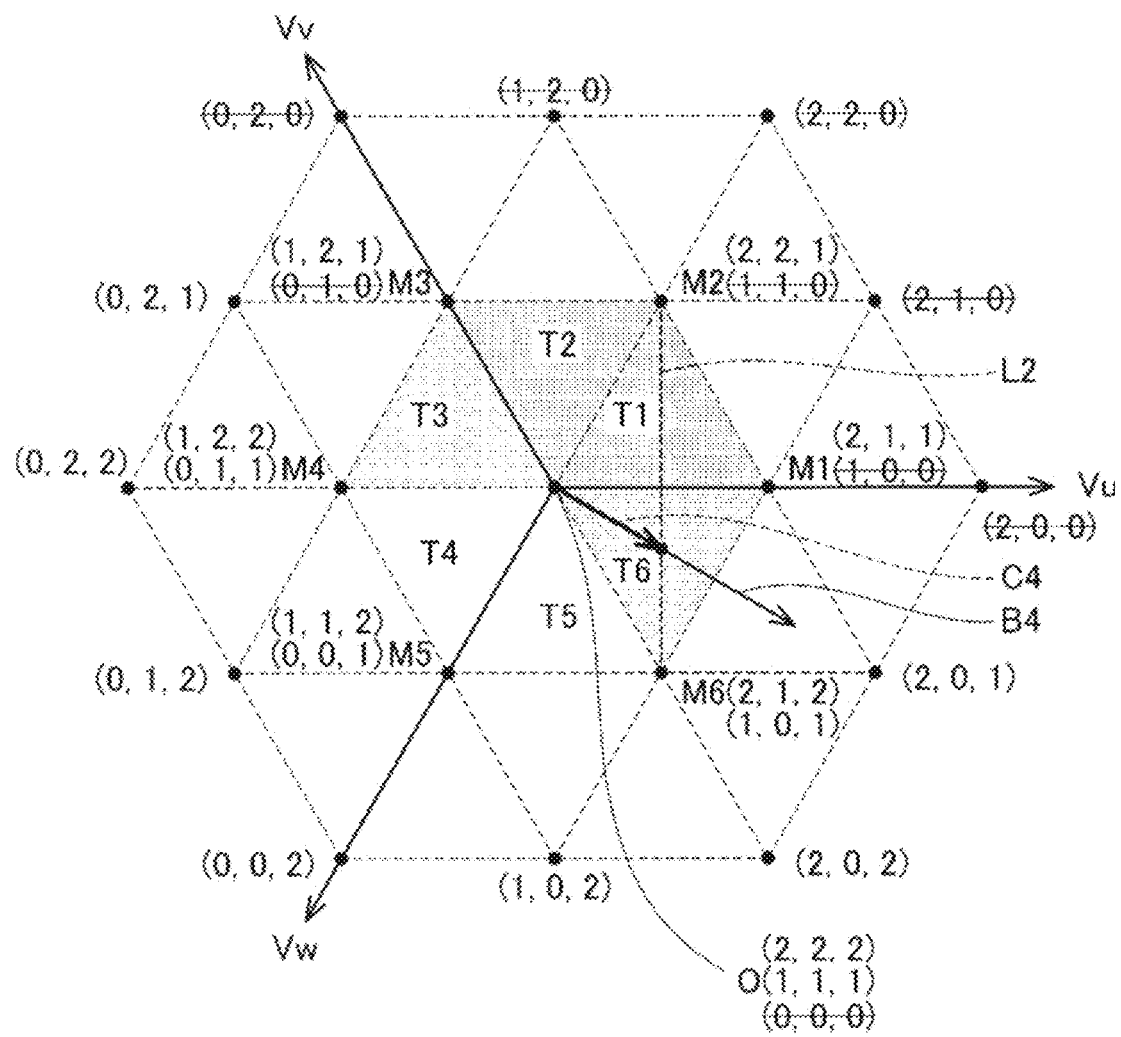
FIG. 17 is a diagram illustrating the spatial vector coordinate system where a primary command value vector belongs to an inner triangular region T6 that is a second restricted triangular region (in the case of the forbidden parameter being Vw=0).

As described above, in the case of outputting a voltage vector belonging to one of the second restricted triangular regions, the inverter 10 identifies the quadrangle formed by the specific second restricted triangular region and the adjacent first restricted triangular region; then, the inverter 10 further identifies the third intermediate coordinate point and the fourth intermediate coordinate point that form the diagonal of the quadrangle which does not include the origin O. Thereafter, the inverter 10 outputs the voltage vector belonging to the second restricted triangular region by outputting, at staggered times, the coordinates of the third intermediate coordinate point, the coordinates of the fourth intermediate coordinate point and the coordinates of the origin O. With this method, it is easy for the time proportion for which the upper coordinates are outputted and the time proportion for which the lower coordinates are outputted to be balanced when a control period during which the primary command value vector belongs to one of the first restricted triangular regions and a control period during which the primary command value vector belongs to one of the second restricted triangular regions are combined. Specifically, in a control period during which the primary command value vector belongs to one of the first restricted triangular regions, the time proportion for which the coordinates of the first intermediate coordinate point are outputted is longer than the time proportion for which the coordinates of the second intermediate coordinate point are outputted. This is because the coordinates of the secondary command value vector are closer to the first intermediate coordinate point than to the second intermediate coordinate point. On the other hand, in a control period during which the primary command value vector belongs to one of the second restricted triangular regions, the time proportion for which the coordinates of the fourth intermediate coordinate point are outputted is longer than the time proportion for which the coordinates of the third intermediate coordinate point are outputted. This is because the coordinates of the secondary command value vector are closer to the fourth intermediate coordinate point than to the third intermediate coordinate point. Furthermore, the coordinates of the first intermediate coordinate point are identical to the coordinates of the third intermediate coordinate point; and the coordinates of the second intermediate coordinate point are identical to the coordinates of the fourth intermediate coordinate point. Therefore, it is easy for the time proportion for which the upper coordinates are outputted and the time proportion for which the lower coordinates are outputted to be balanced when a control period during which the primary command value vector belongs to one of the first restricted triangular regions and a control period during which the primary command value vector belongs to one of the second restricted triangular regions are combined. For example, consider a case where the control shown in FIG. 15 is executed after execution of the control shown in FIG. 17. In this case, in the control shown in FIG. 17, (1, 0, 1) is outputted for a longer period of time and (2, 2, 1) is outputted for a shorter period of time. In contrast, in the control shown in FIG. 15, (2, 2, 1) is outputted for a longer period of time and (1, 0, 1) is outputted for a shorter period of time. Therefore, it is easy for the time proportion for which (1, 0, 1) is outputted and the time proportion for which (2, 2, 1) is outputted to be balanced when a control period during which the control shown in FIG. 17 is executed and a control period during which the control shown in FIG. 15 are combined. That is, it is easy for the time proportion for which the upper coordinates are outputted and the time proportion for which the lower coordinates are outputted to be balanced. Consequently, variation in the neutral-point potential VM can be more effectively suppressed.

Figure 18:
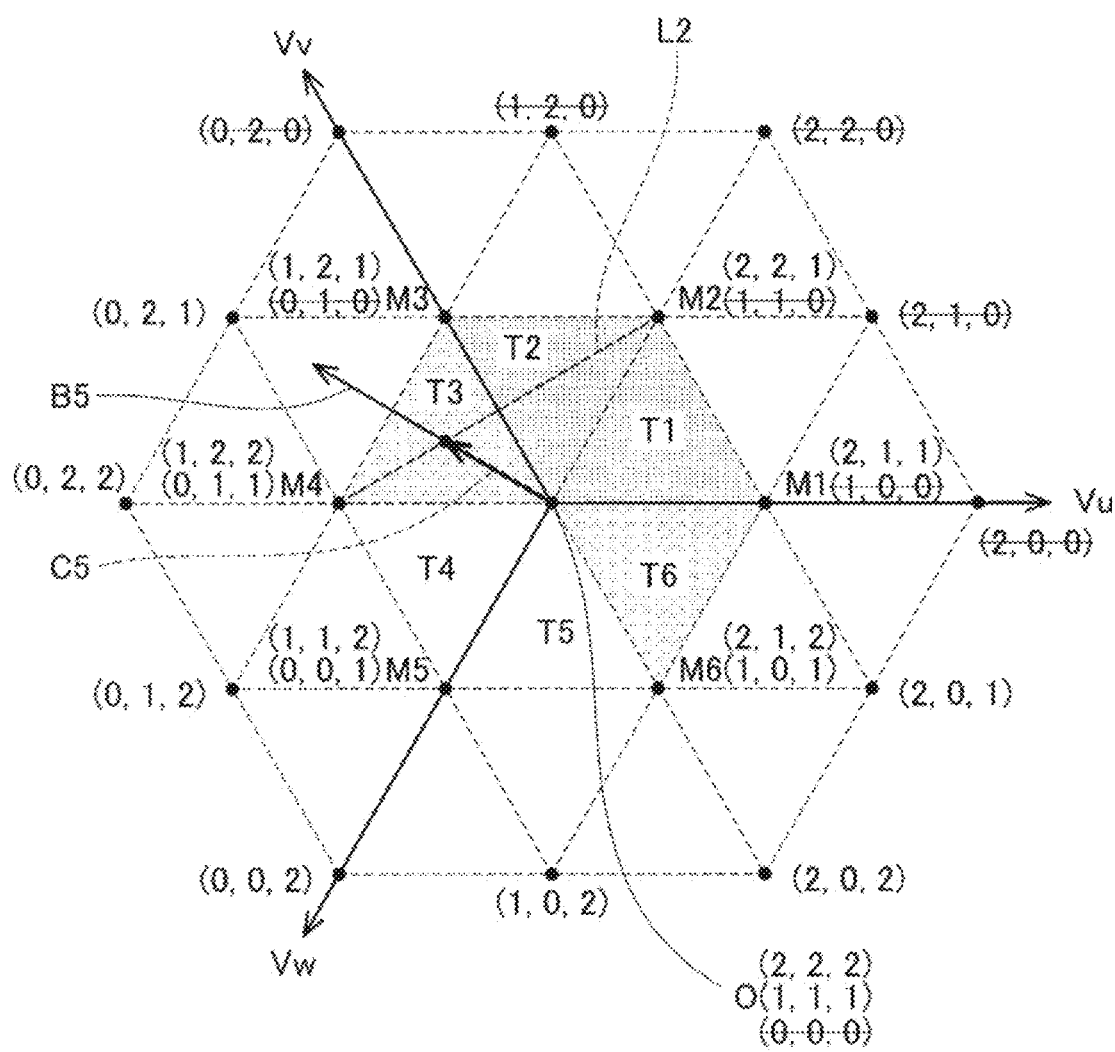
FIG. 18 is a diagram illustrating the spatial vector coordinate system where a primary command value vector belongs to an inner triangular region T3 that is another second restricted triangular region (in the case of the forbidden parameter being Vw=0).

FIG. 18 illustrates a primary command value vector B5 that belongings to the inner triangular region T3 (i.e., one of the second restricted triangular regions). In this case, the specific second restricted triangular region is the inner triangular region T3; the adjacent first restricted triangular region is the inner triangular region T2; the third intermediate coordinate point is the intermediate coordinate point M2; and the fourth intermediate coordinate point is the intermediate coordinate point M4. The command circuit 72 generates a secondary command value vector C5. The control circuit 70 outputs the upper coordinates of the intermediate coordinate point M2, the lower coordinates of the intermediate coordinate point M4 and the coordinates of the origin O at staggered times. By executing the control shown in FIG. 18 after execution of the control shown in FIG. 16, the time proportion for which the upper coordinates are outputted and the time proportion for which the lower coordinates are outputted can be balanced when a control period during which the control shown in FIG. 16 is executed and a control period during which the control shown in FIG. 18 are combined. Consequently, variation in the neutral-point potential VM can be more effectively suppressed.

The inverter 10 according to the first embodiment has been described above. In FIGS. 14 to 18, there are illustrated cases where the forbidden coordinate sets are lower coordinate sets. In contrast, in FIGS. 19 and 20, there are illustrated cases where the forbidden coordinate sets are upper coordinate sets (more specifically, the forbidden parameter is Vw=2). In these cases, the first restricted triangular regions are the inner triangular regions T4 and T5; the second restricted triangular regions are the inner triangular regions T3 and T6; and the normal triangular regions are the inner triangular regions T1 and T2. Moreover, in these cases, the sets of lower coordinates of the first intermediate coordinate point and the third intermediate coordinate point are selected as the coordinates of the first intermediate coordinate point and the third intermediate coordinate point; and the sets of upper coordinates of the second intermediate coordinate point and the fourth intermediate coordinate point are selected as the coordinates of the second intermediate coordinate point and the fourth intermediate coordinate point. For example, in the case shown in FIG. 19, the primary command value vector B6 belongs to the inner triangular region T5 (i.e., one of the first restricted triangular regions); therefore, the coordinates of the first intermediate coordinate point (i.e., the intermediate coordinate point M5), the coordinates of the second intermediate coordinate point (i.e., the intermediate coordinate point M1) and the coordinates of the origin O are successively outputted. Specifically, in this case, (0, 0, 1) is outputted as the coordinates of the intermediate coordinate point M5; and (2, 1, 1) is outputted as the coordinates of the intermediate coordinate point M1. On the other hand, in the case shown in FIG. 20, the primary command value vector B7 belongs to the inner triangular region T6 (i.e., one of the second restricted triangular regions); therefore, the coordinates of the third intermediate coordinate point (i.e., the intermediate coordinate point M5), the coordinates of the fourth intermediate coordinate point (i.e., the intermediate coordinate point M1) and the coordinates of the origin O are successively outputted. Specifically, in this case, (0, 0, 1) is outputted as the coordinates of the intermediate coordinate point M5, and (2, 1, 1) is outputted as the coordinates of the intermediate coordinate point M1. Therefore, it is easy for the time proportion for which the upper coordinates are outputted and the time proportion for which the lower coordinates are outputted to be balanced. Consequently, variation in the neutral-point potential VM can be suppressed.

As described above, in the inverter 10 according to the first embodiment, variation in the neutral-point potential VM during the emergency operation can be suppressed. Consequently, the emergency operation can be continued for a long time.

Second Embodiment

Figure 21:
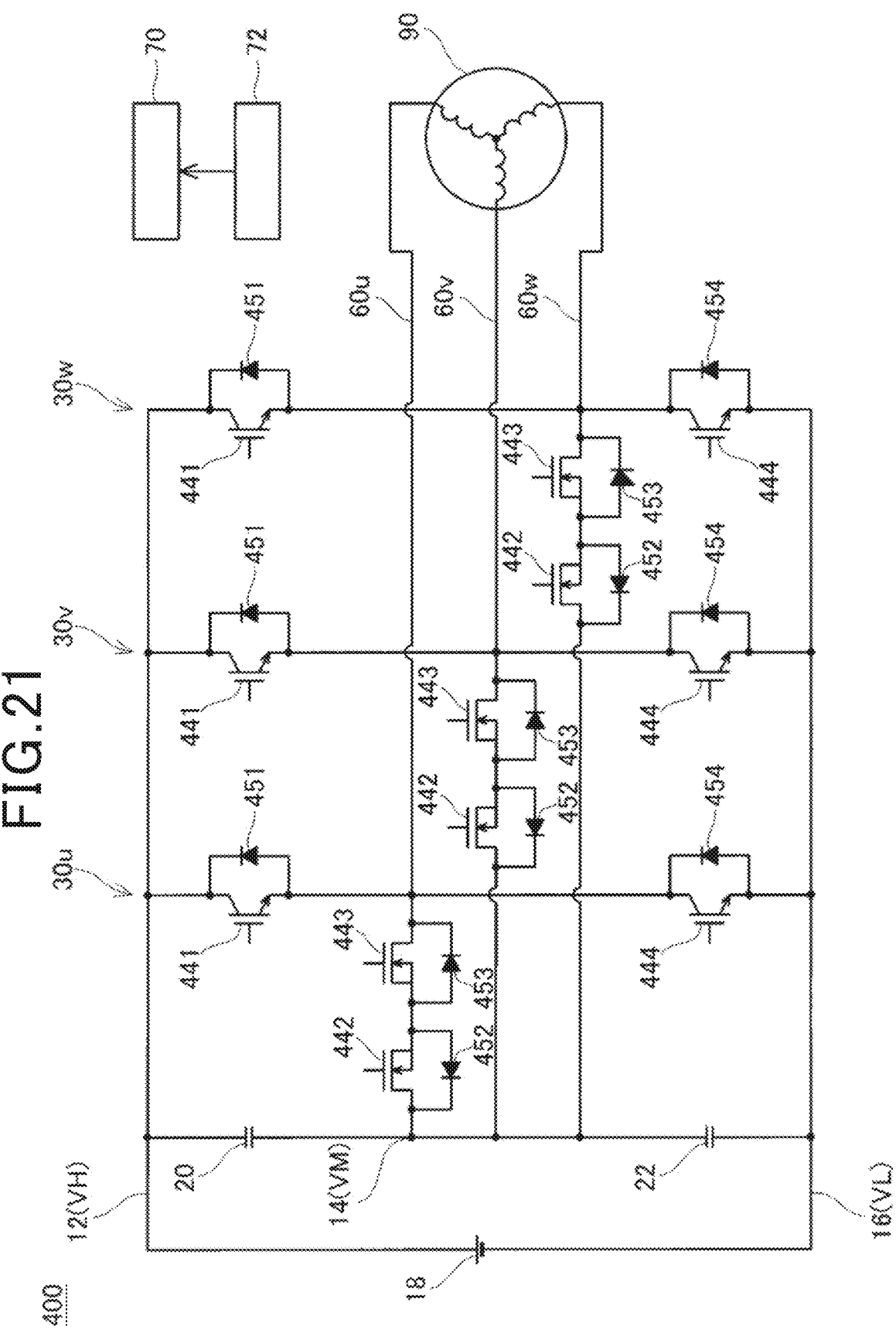
FIG. 21 is a circuit diagram of an inverter according to a second embodiment.

FIG. 21 illustrates an inverter 400 according to the second embodiment. It should be noted that parts of the inverter 400 according the second embodiment which have the same functions as those of the inverter 10 according to the first embodiment are designated by the same reference signs as those of the inverter 10 according to the first embodiment.
(Configuration of Inverter)

The inverter 400 is installed in a vehicle. In the vehicle, there are also installed a battery 18 and a motor 90. The motor 90 is a motor for powering the vehicle to travel. Moreover, the motor 90 is a three-phase motor. The inverter 400 is connected with both the battery 18 and the motor 90.

The inverter 400 converts DC power supplied from the battery 18 into three-phase AC power and supplies the three-phase AC power to the motor 90. Consequently, the motor 90 is driven to power the vehicle to travel.

The inverter 400 has a higher-potential wiring 12, a neutral point 14, a lower-potential wiring 16, an upper capacitor 20 and a lower capacitor 22. The higher-potential wiring 12 is connected with a positive electrode of the battery 18. On the other hand, the lower-potential wiring 16 is connected with a negative electrode of the battery 18. Hereinafter, the electric potential of the lower-potential wiring 16 is defined as a reference potential (0V). A DC voltage is applied between the higher-potential wiring 12 and the lower-potential wiring 16 by the battery 18. Therefore, the higher-potential wiring 12 has an electric potential VH higher than the electric potential (0V) of the lower-potential wiring 16. The upper capacitor 20 is connected between the higher-potential wiring 12 and the neutral point 14. On the other hand, the lower capacitor 22 is connected between the neutral point 14 and the lower-potential wiring 16. Therefore, the electric potential VM of the neutral point 14 (hereinafter, to be referred to as the neutral-point potential VM) is higher than the electric potential (0V) of the lower-potential wiring 16 and lower than the electric potential VH of the higher-potential wiring 12. The neutral-point potential VM varies depending on both the amount of electric charge stored in the upper capacitor and the amount of electric charge stored in the lower capacitor 22. Specifically, the neutral-point potential VM rises when the upper capacitor 20 is discharged or the lower capacitor 22 is charged. Conversely, the neutral-point potential VM drops when the upper capacitor 20 is charged or the lower capacitor 22 is discharged.

The inverter 400 includes three switching circuits 30, i.e., a U-phase switching circuit 30u, a V-phase switching circuit 30v and a W-phase switching circuit 30w. Each of the switching circuits 30 is connected between the higher-potential wiring 12, the lower-potential wiring 16 and the neutral point 14. Moreover, each of the switching circuits 30 includes a first switching element 441, a second switching element 442, a third switching element 443, a fourth switching element 444, a first diode 451, a second diode 452, a third diode 453, a fourth diode 454 and an output wiring 60. The three switching circuits 30 are identical in configuration to each other; therefore, the configuration of only one of the switching circuits 30 will be described below.

Each of the switching elements 441 to 444 is constituted of an IGBT. It should be noted that each of the switching elements 441 to 444 may alternatively be constituted of other elements, such as a FET.

The first switching element 441 is connected between the higher-potential wiring 12 and the output wiring 60. Specifically, the collector of the first switching element 441 is connected with the higher-potential wiring 12, while the emitter of the first switching element 441 is connected with the output wiring 60.

The first diode 451 is connected in parallel to the first switching element 441. Specifically, the anode of the first diode 451 is connected with the emitter of the first switching element 441, while the cathode of the first diode 451 is connected with the collector of the first switching element 441.

The fourth switching element 444 is connected between the output wiring 60 and the lower-potential wiring 16. Specifically, the collector of the fourth switching element 444 is connected with the output wiring 60, while the emitter of the fourth switching element 444 is connected with the lower-potential wiring 16.

The fourth diode 454 is connected in parallel to the fourth switching element 444. Specifically, the anode of the fourth diode 454 is connected with the emitter of the fourth switching element 444, while the cathode of the fourth diode 454 is connected with the collector of the fourth switching element 444.

The second switching element 442 and the third switching element 443 are connected in series with each other between the output wiring 60 and the neutral point 14. Specifically, a drain of the second switching element 442 is connected with the neutral point 14; a source of the second switching element 442 is connected with a source of the third switching element 443; and a drain of the third switching element 443 is connected with the output wiring 60.

The second diode 452 is connected in parallel to the second switching element 442. Specifically, the anode of the second diode 452 is connected with the source of the second switching element 442, while the cathode of the second diode 452 is connected with the drain of the second switching element 442. That is, the second diode 452 is connected, with its cathode oriented toward the neutral point 14 side, in parallel to the second switching element 442.

The third diode 453 is connected in parallel to the third switching element 443. Specifically, the anode of the third diode 453 is connected with the source of the third switching element 443, while the cathode of the third diode 453 is connected with the drain of the third switching element 443. That is, the third diode 453 is connected, with its cathode oriented toward the output wiring 60 side, in parallel to the third switching element 443.

Hereinafter, the output wiring 60 of the U-phase switching circuit 30u will be referred to as the U-phase output wiring 60u; the output wiring 60 of the V-phase switching circuit 30v will be referred to as the V-phase output wiring 60v; and the output wiring 60 of the W-phase switching circuit 30w will be referred to as the W-phase output wiring 60W. Each of the U-phase output wiring 60u, the V-phase output wiring 60v and the W-phase output wiring 60w is connected with the motor 90.

The inverter 400 includes a control circuit 70 and a command circuit 72. The command circuit 72 generates command values according to the operating state of the motor 90 and inputs the generated command values to the control circuit 70. Although not shown in the drawings, the control circuit 70 is connected with the gates of the switching elements 441 to 444 of each of the U-phase switching circuit 30u, the V-phase switching circuit 30v and the W-phase switching circuit 30w. That is, the control circuit 70 is connected with the gates of all the twelve switching elements shown in FIG. 21. The control circuit 70 turns on and off each switching element based on the command values inputted from the command circuit 72. Consequently, three-phase alternating current is generated between the three output wirings 60. Further, with supply of the three-phase alternating current to the motor 90, the motor 90 is driven to power the vehicle to travel.

(Electric Potential of Output Wiring)

Next, the electric potential applied to each output wiring 60 will be described. The control circuit 70 controls each switching circuit 30 to be in one of a first state, a second state and a third state as shown in FIG. 22.

In the first state, the first switching element 441 is in the ON state; the second switching element 442 is in the OFF state; the third switching element 443 is in the OFF state; and the fourth switching element 444 is in the OFF state. Therefore, in the first state, the output wiring 60 is connected with the higher-potential wiring 12 via the first switching element 441. Consequently, in the first state, the electric potential of the output wiring 60 becomes equal to the electric potential VH of the higher-potential wiring 12.

In the second state, the first switching element 441 is in the OFF state; the second switching element 442 is in the ON state; the third switching element 443 is in the ON state; and the fourth switching element 444 in the OFF state. Therefore, in the second state, the output wiring 60 is connected with the neutral point 14 via both the second switching element 442 and the third switching element 443. Consequently, in the second state, the electric potential of the output wiring 60 becomes equal to the neutral-point potential VM.

In the third state, the first switching element 441 is in the OFF state; the second switching element 442 is in the OFF state; the third switching element 443 is in the OFF state; and the fourth switching element 444 is in the ON state. Therefore, in the third state, the output wiring 60 is connected with the lower-potential wiring 16 via the fourth switching element 444. Consequently, in the third state, the electric potential of the output wiring 60 becomes equal to the electric potential of the lower-potential wiring 16, i.e., 0V.

With change in the states of the switching circuits 30 between the first state, the second state and the third state, the electric potentials of the output wirings 60 change between the higher potential VH, the neutral-point potential VM and 0V. The control circuit 70 generates three-phase alternating current in the output wirings 60 by controlling the electric potentials of the output wirings 60.

(Normal Operation)

In the present embodiment, the command circuit 72 generates command value vectors represented by coordinates in a spatial vector coordinate system, as in the first embodiment. When there is no short-circuited element in the inverter 400, the control circuit 70 performs a normal operation. In the normal operation, the control circuit 70 controls the inverter 400 according to primary command value vectors. The normal operation performed in the second embodiment is the same as the normal operation performed in the first embodiment.

(Variation in Neutral-Point Potential VM)

Figure 23:
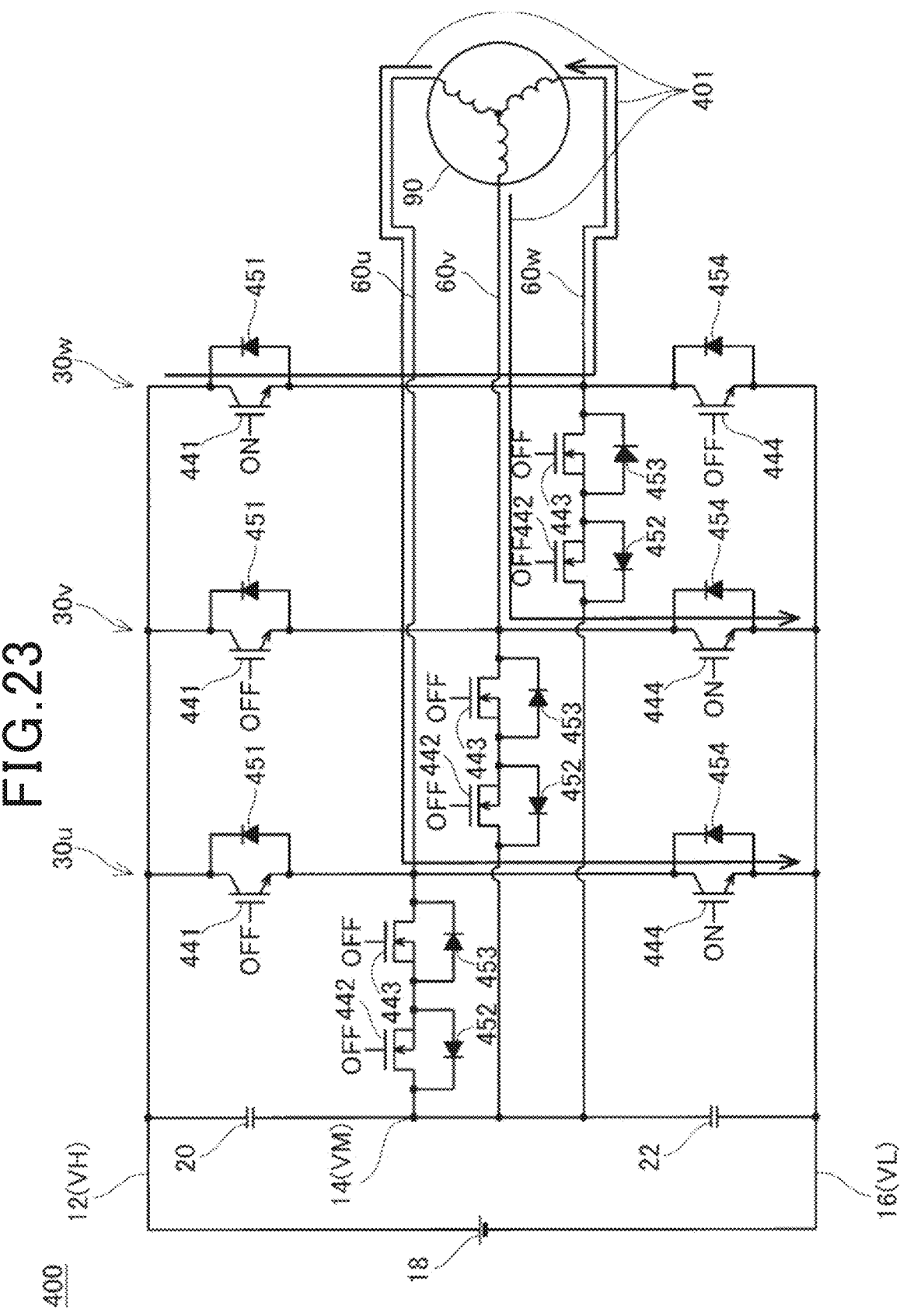
FIG. 23 is a circuit diagram illustrating an electric current path when (0, 0, 2) is outputted.

Next, variation in the neutral-point potential VM will be described. In cases of outputting voltage vectors represented by those of the coordinate sets shown in FIG. 3 which do not include the numerical value 1, the neutral-point potential VM is not applied to any of the three output wirings 60. In this case, no variation occurs in the neutral-point potential VM. For example, in the case where (0, 0, 2) is outputted, both the output wirings 60u and 60v are connected to the lower-potential wiring 16 and the output wiring 60w is connected to the higher-potential wiring 12, as shown in FIG. 23. Moreover, depending on the operating state of the motor 90, electric current may flow in the same direction as the voltage applied to the motor 90 (hereinafter, to be referred to as the forward direction) or in the opposite direction to the voltage applied to the motor 90 (hereinafter, to be referred to as the reverse direction). When electric current flows in the forward direction, it flows from the higher-potential wiring 12 to the motor 90 via the output wiring 60w, as indicated by arrows 401 in FIG. 23. Moreover, the electric current, which has flowed into the motor 90, further flows to the lower-potential wiring 16 via both the output wirings 60u and 60v. On the other hand, when electric current flows in the reverse direction, it flows in the opposite direction to the arrows 401. Consequently, in the case where (0, 0, 2) is outputted, no electric charge flows into the neutral point 14; and no electric charge flows out of the neutral point 14. As a result, no variation occurs in the neutral-point potential VM. Similarly, in cases where any of (2, 0, 0), (2, 2, 0), (0, 2, 0), (0, 2, 2) and (2, 0, 2) is outputted as a voltage vector, no variation occurs in the neutral-point potential VM.

In cases of outputting voltage vectors represented by those of the coordinate sets shown in FIG. 3 which include the numerical value 1, the neutral point 14 is connected to at least one of the three output wirings 60; thus, variation occurs in the neutral-point potential VM.

Figure 24:
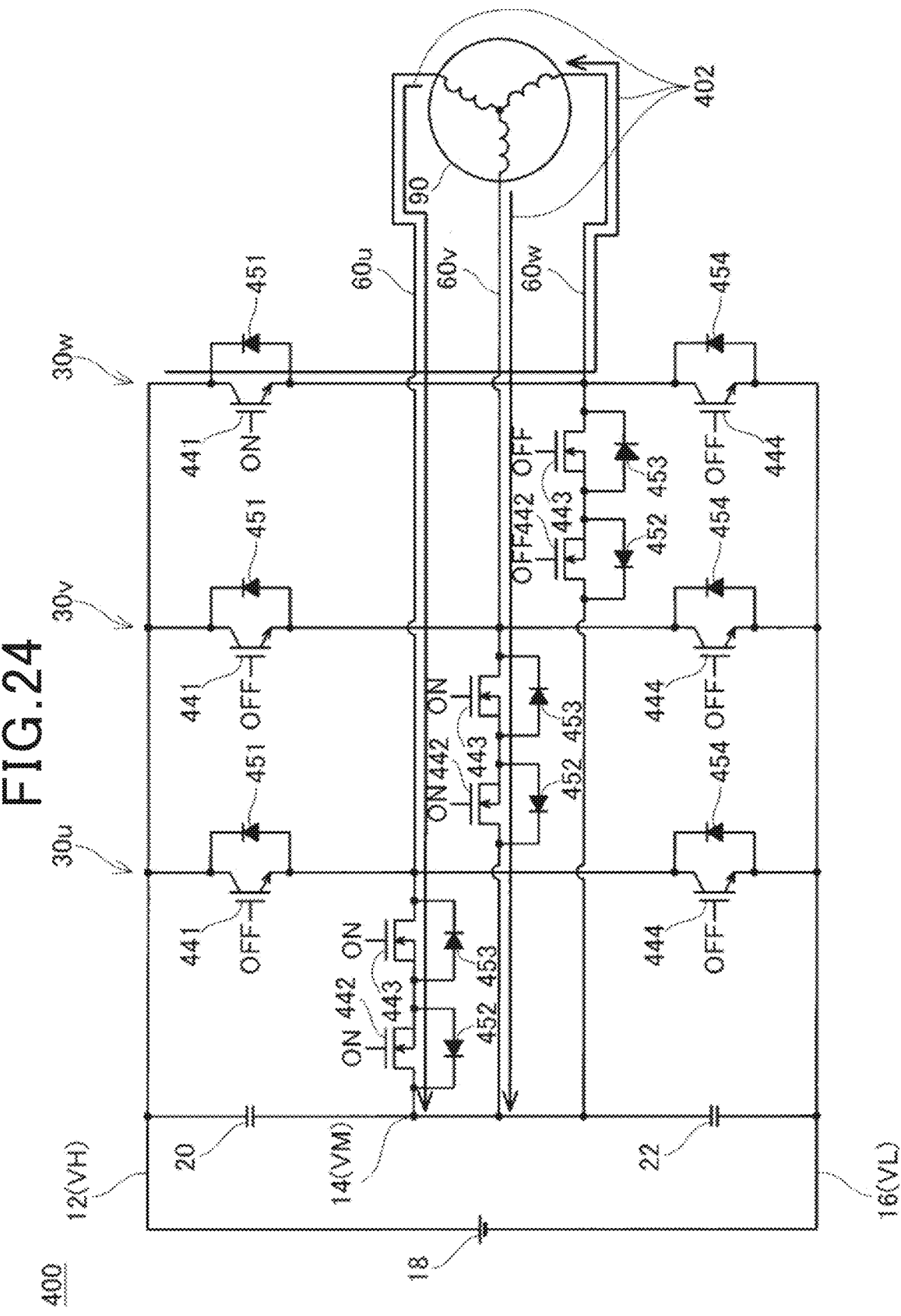
FIG. 24 is a circuit diagram illustrating an electric current path when (1, 1, 2) is outputted.

For example, in the case where (1, 1, 2) is outputted, both the output wirings 60u and 60v are connected to the neutral point 14 and the output wiring 60w is connected to the higher-potential wiring 12, as shown in FIG. 24. In this case, when electric current flows in the forward direction, it flows from the higher-potential wiring 12 to the motor 90 via the output wiring 60w, as indicated by arrows 402 in FIG. 24. Moreover, the electric current, which has flowed into the motor 90, further flows to the neutral point 14 via both the output wirings 60u and 60v. Consequently, the upper capacitor 20 is discharged, causing the neutral-point potential VM to rise. On the other hand, when electric current flows in the reverse direction, it flows in the opposite direction to the arrows 402. Consequently, the upper capacitor 20 is charged, causing the neutral-point potential VM to drop. As above, in the case where (1, 1, 2) is outputted as a voltage vector, the neutral-point potential VM rises when the electric current flows in the forward direction, and drops when the electric current flows in the reverse direction. Similarly, in cases where any of (2, 1, 1), (2, 2, 1), (1, 2, 1), (1, 2, 2) and (2, 1, 2) is outputted as a voltage vector, the neutral-point potential VM rises when the electric current flows in the forward direction, and drops when the electric current flows in the reverse direction.

Figure 25:
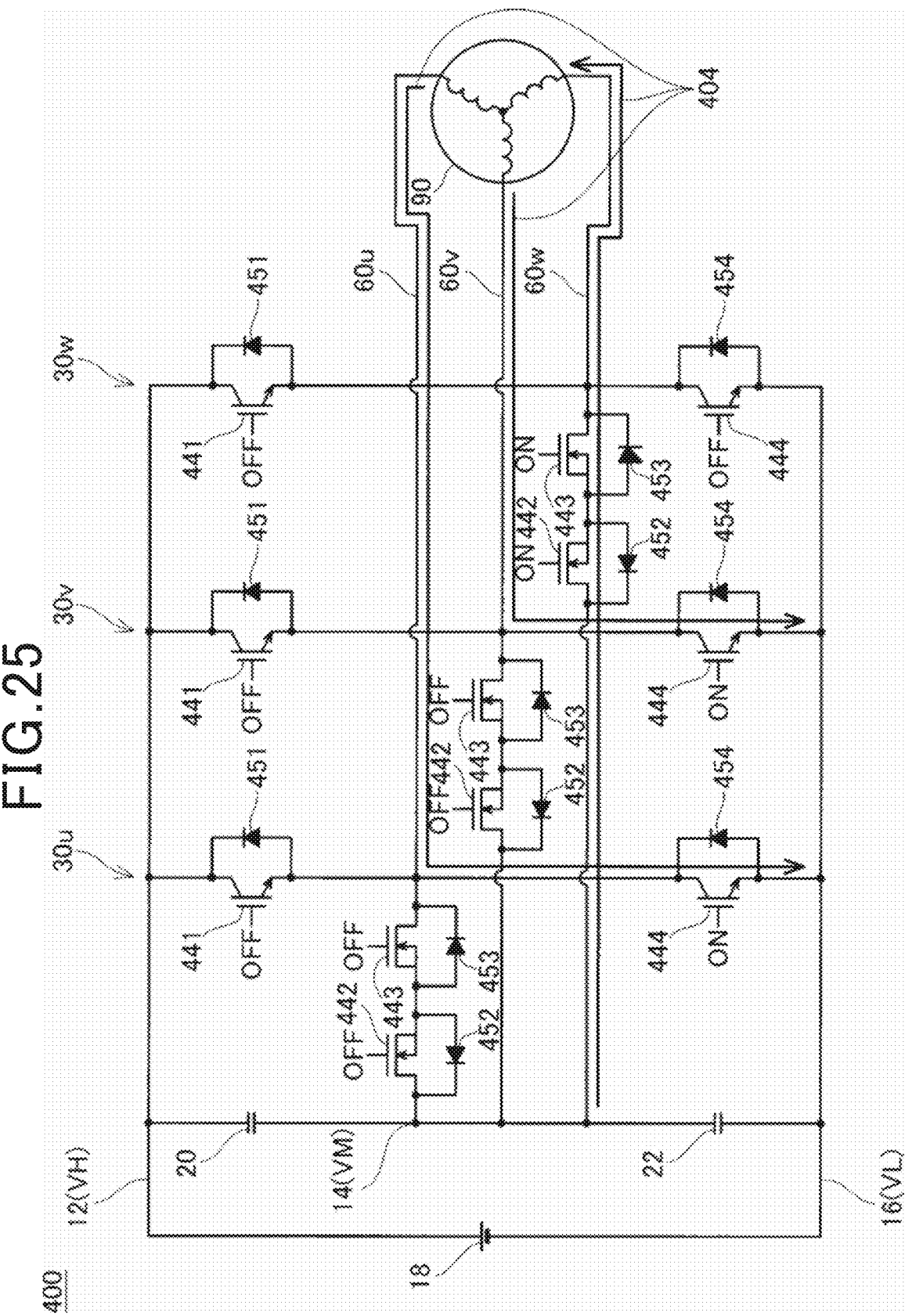
FIG. 25 is a circuit diagram illustrating an electric current path when (0, 0, 1) is outputted.

For example, in the case where (0, 0, 1) is outputted, both the output wirings 60u and 60v are connected to the lower-potential wiring 16 and the output wiring 60w is connected to the neutral point 14, as shown in FIG. 25. In this case, when electric current flows in the forward direction, it flows from the neutral point 14 to the motor 90 via the output wiring 60w, as indicated by arrows 404 in FIG. 25. Moreover, the electric current, which has flowed into the motor 90, further flows to the lower-potential wiring 16 via both the output wirings 60u and 60v. Consequently, the lower capacitor 22 is discharged, causing the neutral-point potential VM to drop. On the other hand, when electric current flows in the reverse direction, it flows in the opposite direction to the arrows 404. Consequently, the lower capacitor 22 is charged, causing the neutral-point potential VM to rise. As above, in the case where (0, 0, 1) is outputted as a voltage vector, the neutral-point potential VM drops when the electric current flows in the forward direction, and rises when the electric current flows in the reverse direction. Similarly, in cases where any of (1, 0, 0), (1, 1, 0), (0, 1, 0), (0, 1, 1) and (1, 0, 1) is outputted as a voltage vector, the neutral-point potential VM drops when the electric current flows in the forward direction, and rises when the electric current flows in the reverse direction.

Moreover, in cases where any of (2, 1, 0), (1, 2, 0), (0, 2, 1), (0, 1, 2), (1, 0, 2) and (2, 0, 1) among the coordinate sets shown in FIG. 3 is outputted as a voltage vector, electric charge flows into or out of the neutral point 14, resulting in variation in the neutral-point potential VM.

In the normal operation, the command circuit 72 and the control circuit 70 change the output voltage vectors according to the neutral-point potential VM. For example, when the neutral-point potential VM becomes lower than a control target value, a voltage vector for raising the neutral-point potential VM is outputted preferentially. In contrast, when the neutral-point potential VM becomes higher than the control target value, a voltage vector for lowering the neutral-point potential VM is outputted preferentially. Consequently, it becomes possible to supply three-phase alternating current to the motor 90 while controlling the neutral-point potential VM to be close to the target value.

(Short-Circuited Element Determination Operation)

The control circuit 70 periodically performs a short-circuited element determination operation when the vehicle is not traveling. In the short-circuited element determination operation, the control circuit 70 determines, for each of the switching circuits 30u, 30v and 30w, whether any of the switching elements 441 to 444 is short-circuited. Specifically, the control circuit 70 determines whether there is a short-circuited element in the switching circuit 30; and when it is determined that there is a short-circuited element, the control circuit 70 further determines which of the switching elements 441 to 444 is the short-circuited element.

(A. Emergency Operation)

Next, an emergency operation will be described. The command circuit 72 and the control circuit 70 can perform the emergency operation when the second switching element 442 or the third switching element 443 is short-circuited. It should be noted that when the first switching element 441 or the fourth switching element 444 is short-circuited, the inverter 400 cannot perform the emergency operation. In the emergency operation, the restricted switching circuit 30x is controlled so as to prevent a forbidden potential from being applied to the restricted output wiring 60x. First, the forbidden potential will be described.

(A-1. Forbidden Potential)

The forbidden potential denotes a voltage that cannot be applied to the restricted output wiring 60x because of occurrence of an inter-line short circuit in the restricted switching circuit 30x. The forbidden potential varies depending on the type of the short-circuited element in the restricted switching circuit 30x.

When the second switching element 442 is short-circuited, upon the fourth switching element 444 being turned on, short-circuit current will flow from the neutral point 14 to the lower-potential wiring 16 via the second switching element 442, the third diode 453 and the fourth switching element 444. Therefore, when the second switching element 42 is short-circuited, the fourth switching element 444 is not allowed to be turned on. Accordingly, when the second switching element 442 is short-circuited, the forbidden potential is 0V.

Otherwise, when the third switching element 443 is short-circuited, upon the first switching element 441 being turned on, short-circuit current will flow from the higher-potential wiring 12 to the neutral point 14 via the first switching element 441, the third switching element 443 and the second diode 452. Therefore, when the third switching element 443 is short-circuited, the first switching element 441 is not allowed to be turned on. Accordingly, when the third switching element 443 is short-circuited, the forbidden potential is the higher potential VH.

(A-2. Emergency Operation when Forbidden Potential is 0V or Higher Potential VH)

Figure 19:
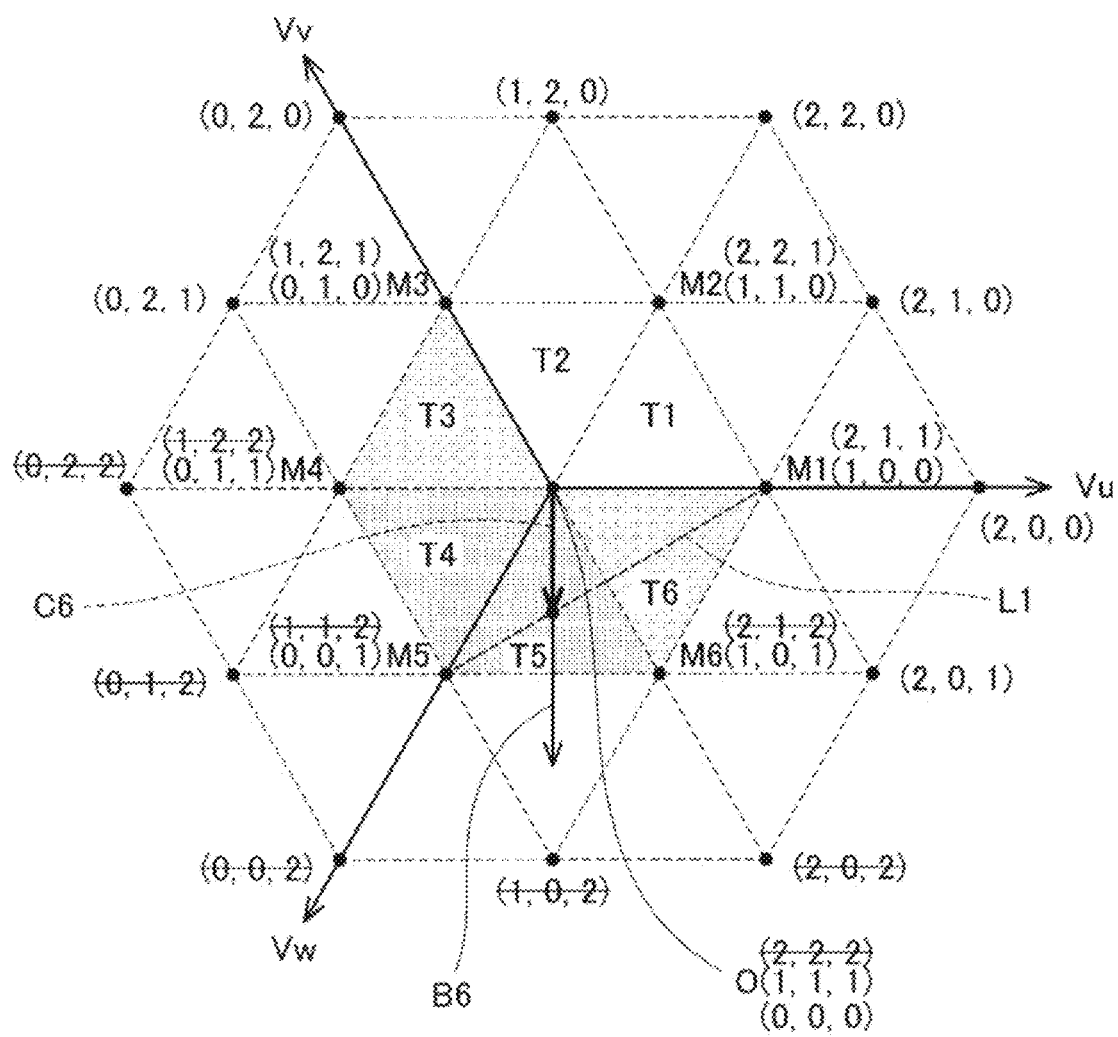
FIG. 19 is a diagram illustrating the spatial vector coordinate system where a primary command value vector belongs to the inner triangular region T5 that is a first restricted triangular region (in the case of the forbidden parameter being Vw=2).
Figure 20:
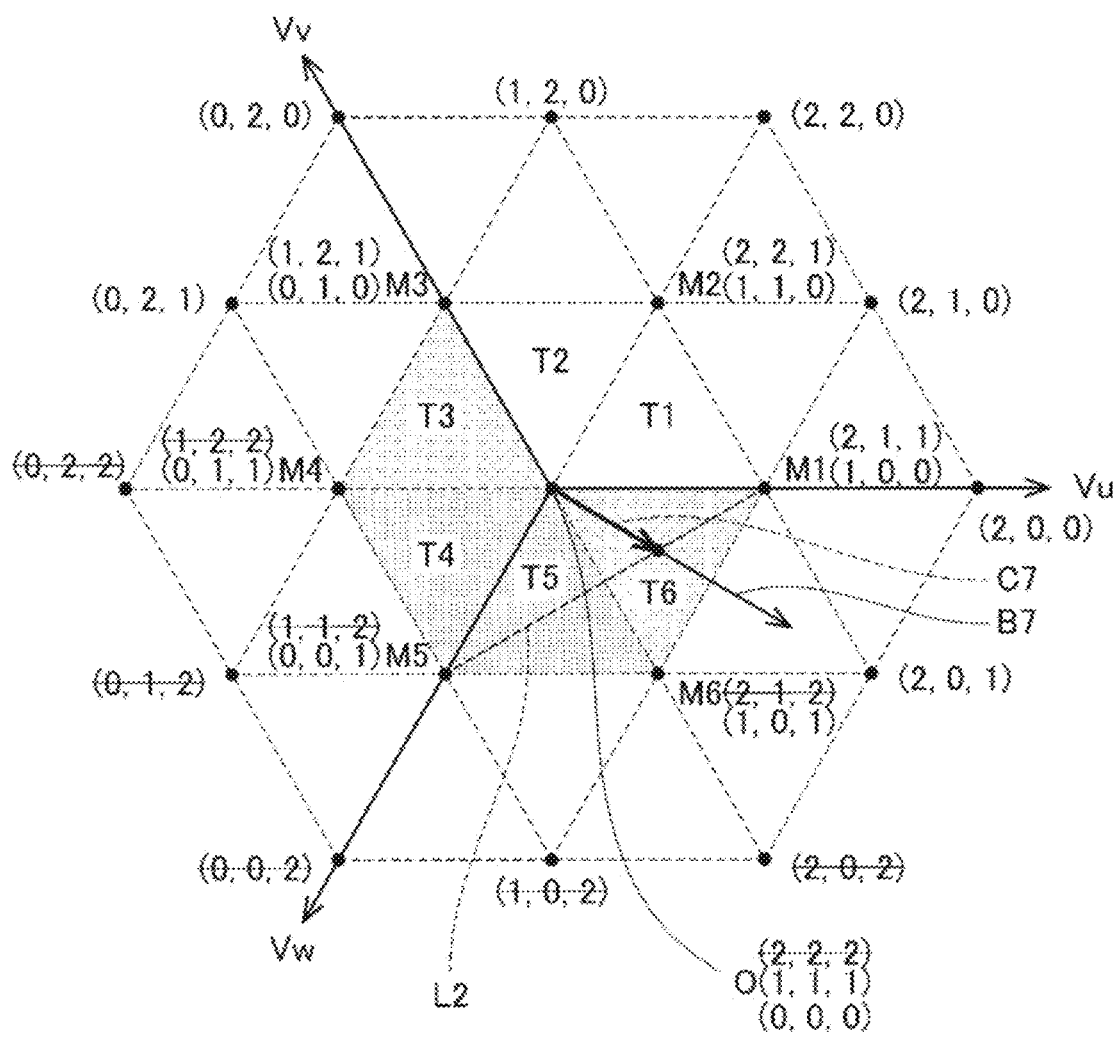
FIG. 20 is a diagram illustrating the spatial vector coordinate system where a primary command value vector belongs to the inner triangular region T6 that is a second restricted triangular region (in the case of the forbidden parameter being Vw=2).

When the forbidden potential is 0V or the higher potential VH, the emergency operation performed in the second embodiment is the same as that performed in the first embodiment. Specifically, when the primary command value vector belongs to one of the normal triangular regions as shown in FIG. 14, a voltage vector is outputted as in the normal operation. In contrast, when the primary command value vector belongs to one of the first restricted triangular regions as shown in FIGS. 15, 16 and 19, the command circuit 72 first calculates a line segment L1 and then calculates a secondary command value vector that does not exceed the line segment L1, as in the first embodiment. Thereafter, as in the first embodiment, the control circuit 70 outputs, at staggered times, the normal coordinates of a first intermediate coordinate point, the coordinates of a second intermediate coordinate point (i.e., the set of coordinates of the second intermediate coordinate point on the opposite site to the set of coordinates outputted as the normal coordinates of the first intermediate coordinate point) and the coordinates of the origin O. Otherwise, when the primary command value vector belongs to one of the second restricted triangular regions as shown in FIGS. 17, 18 and 20, the command circuit 72 first calculates a line segment L2 and then calculates a secondary command value vector that does not exceed the line segment L2, as in the first embodiment. Thereafter, as in the first embodiment, the control circuit 70 outputs, at staggered times, the normal coordinates of a third intermediate coordinate point, the coordinates of a fourth intermediate coordinate point (i.e., the set of coordinates of the fourth intermediate coordinate point on the opposite site to the set of coordinates outputted as the normal coordinates of the third intermediate coordinate point) and the coordinates of the origin O. Consequently, in the emergency operation according to the second embodiment, variation in the neutral-point potential VM can be suppressed as in the emergency operation according to the first embodiment.

As described above, in the inverter 400 according to the second embodiment, variation in the neutral-point potential VM during the emergency operation can be suppressed. Consequently, the emergency operation can be continued for a long time.

The diode 452 in the second embodiment is an example of a first intermediate diode. The diode 453 in the second embodiment is an example of a second intermediate diode.

The state where the primary command value vector belongs to one of the first restricted triangular regions as shown in FIGS. 15, 16 and 19 in the first and second embodiments is an example of a restricted state. The state where the primary command value vector belongs to one of the second restricted triangular regions as shown in FIGS. 17, 18 and 20 in the first and second embodiments is an example of a preliminary state.

While the above particular embodiments have been shown and described, it will be understood by those skilled in the art that various modifications, changes, and improvements may be made without departing from the spirit of the present disclosure.

For example, in the emergency operation, the control methods according to the above-described first and second embodiments may be executed in combination with other control methods. For example, when the neutral-point potential VM is within an allowable range, other control methods may be executed; when the neutral-point potential VM is outside the allowable range, the control methods according to the first and second embodiments may be executed to suppress further variation in the neutral-point potential VM.

What is claimed is:

1. An inverter comprising:
a higher-potential wiring;
a lower-potential wiring;
a neutral point;
an upper capacitor connected between the higher-potential wiring and the neutral point;
a lower capacitor connected between the neutral point and the lower-potential wiring;
three switching circuits which include a U-phase switching circuit, a V-phase switching circuit and a W-phase switching circuit;
a command circuit; and
a control circuit,
wherein:
each of the three switching circuits includes a plurality of semiconductor elements and an output wiring;
the control circuit controls the three switching circuits so as to change each of electrical potentials of a U-phase output wiring, a V-phase output wiring and a W-phase output wiring between a higher potential, a neutral-point potential and a lower-potential, the U-phase output wiring being the output wiring of the U-phase switching circuit, the V-phase output wiring being the output wiring of the V-phase switching circuit, the W-phase output wiring being the output wiring of the W-phase switching circuit, the higher potential being an electric potential of the higher-potential wiring, the neutral-point potential being an electric potential at the neutral point, the lower potential being an electric potential of the lower-potential wiring;
the command circuit generates a command value vector constituted of a voltage vector represented by a spatial vector coordinate system defined by parameters Vu, Vv and Vw;
the parameter Vu is a parameter indicating whether the electric potential of the U-phase output wiring is the higher potential, the neutral-point potential or the lower potential;
the parameter Vv is a parameter indicating whether the electric potential of the V-phase output wiring is the higher potential, the neutral-point potential or the lower potential;
the parameter Vw is a parameter indicating whether the electric potential of the W-phase output wiring is the higher potential, the neutral-point potential or the lower potential;
the control circuit controls the three switching circuits based on the command value vector;
the spatial vector coordinate system has a plurality of intermediate coordinate points located between an origin and outermost coordinate points;
each of the plurality of intermediate coordinate points has both a set of upper coordinates representing a voltage vector that changes a voltage of the upper capacitor and a set of lower coordinates representing a voltage vector that changes a voltage of the lower capacitor;
the spatial vector coordinate system has a plurality of triangular regions each of which has three vertices respectively constituted of the origin and adjacent two of the plurality of intermediate coordinate points;
the control circuit is configured to perform an emergency operation when one of the semiconductor elements is short-circuited so that in one of the three switching circuits, a forbidden potential cannot be applied to the output wiring, the forbidden potential being either of the higher potential and the lower potential;

the one of the semiconductor elements which is short-circuited constitutes a short-circuited element;

the output wiring of that one of the three switching circuits which includes the short-circuited element constitutes a restricted output wiring;

the output wirings of those two of the three switching circuits which do not include the short-circuited element constitute normal output wirings;

in the emergency operation, the control circuit changes the electric potential of the restricted output wiring between two of the higher potential, the neutral-point potential and the lower potential excluding the forbidden potential, and changes each of the electric potentials of the normal output wirings between the higher potential, the neutral-point potential and the lower potential;

in the emergency operation, the plurality of intermediate coordinate points include a plurality of normal intermediate coordinate points at each of which neither the set of upper coordinates nor the set of lower coordinates includes a forbidden parameter representing the forbidden potential, and a plurality of restricted intermediate coordinate points at each of which one of the set of upper coordinates and the set of lower coordinates includes the forbidden parameter and the other of the set of upper coordinates and the set of lower coordinates does not include the forbidden parameter;

in the emergency operation, the plurality of triangular regions include first restricted triangular regions in each of which the two intermediate coordinate points respectively constituting two of the three vertices are respectively two of the restricted intermediate coordinate points, second restricted triangular regions in each of which one of the two intermediate coordinate points respectively constituting two of the three vertices is one of the normal intermediate coordinate points and the other of the two intermediate coordinate points is one of the restricted intermediate coordinate points, and normal triangular regions in each of which the two intermediate coordinate points respectively constituting two of the three vertices are respectively two of the normal intermediate coordinate points;

in the emergency operation, in a restricted state where the command value vector belongs to one of the first restricted triangular regions, the control circuit outputs, at staggered times, coordinates of the origin, first coordinates that are coordinates of a first intermediate coordinate point and second coordinates that are coordinates of a second intermediate coordinate point;

in the restricted state, of the two intermediate coordinate points that form a diagonal, which does not include the origin, of a quadrangle formed by a specific first restricted triangular region and an adjacent second restricted triangular region, the intermediate coordinate point within the specific first restricted triangular region is the first intermediate coordinate point and the intermediate coordinate point within the adjacent second restricted triangular region is the second intermediate coordinate point;

the specific first restricted triangular region is the one of the first restricted triangular regions to which the command value vector belongs, and the adjacent second restricted triangular region is one of the second restricted triangular regions which is adjacent to the specific first restricted triangular region;

the first coordinates are that one of the set of upper coordinates and the set of lower coordinates of the first intermediate coordinate point which does not include the forbidden parameter; and the second coordinates are the set of lower coordinates of the second intermediate coordinate point when the first coordinates are the set of upper coordinates of the first intermediate coordinate point, and are the set of upper coordinates of the second intermediate coordinate point when the first coordinates are the set of lower coordinates of the first intermediate coordinate point.

2. The inverter as set forth in claim 1, wherein:
in the restricted state, the command circuit generates the command value vector that does not exceed a line segment connecting the first intermediate coordinate point and the second intermediate coordinate point.

3. The inverter as set forth in claim 1, wherein:
in the emergency operation, in a preliminary state where the command value vector belongs to one of the second restricted triangular regions, the control circuit outputs, at staggered times, the coordinates of the origin, third coordinates that are coordinates of a third intermediate coordinate point and fourth coordinates that are coordinates of a fourth intermediate coordinate point;

in the preliminary state, of the two intermediate coordinate points that form a diagonal, which does not include the origin, of a quadrangle formed by a specific second restricted triangular region and an adjacent first restricted triangular region, the intermediate coordinate point within the adjacent first restricted triangular region is the third intermediate coordinate point and the intermediate coordinate point within the specific second restricted triangular region is the fourth intermediate coordinate point;

the specific second restricted triangular region is the one of the second restricted triangular regions to which the command value vector belongs, and the adjacent first restricted triangular region is one of the first restricted triangular regions which is adjacent to the specific second restricted triangular region;

the third coordinates are that one of the set of upper coordinates and the set of lower coordinates of the third intermediate coordinate point which does not include the forbidden parameter; and the fourth coordinates are the set of lower coordinates of the fourth intermediate coordinate point when the third coordinates are the set of upper coordinates of the third intermediate coordinate point, and are the set of upper coordinates of the fourth intermediate coordinate point when the third coordinates are the set of lower coordinates of the third intermediate coordinate point.

4. The inverter as set forth in claim 3, wherein:
in the preliminary state, the command circuit generates the command value vector that does not exceed a line segment connecting the third intermediate coordinate point and the fourth intermediate coordinate point.

5. The inverter as set forth in claim 1, wherein:
each of the three switching circuits includes:
a first switching element whose positive electrode is connected with the higher-potential wiring;
a second switching element whose positive electrode is connected with a negative electrode of the first switching element and whose negative electrode is connected with the output wiring;
a third switching element whose positive electrode is connected with the output wiring;
a fourth switching element whose positive electrode is connected with a negative electrode of the third switching element and whose negative electrode is connected with the lower-potential wiring;

a first diode whose anode is connected with the neutral point and whose cathode is connected with the negative electrode of the first switching element; and a second diode whose anode is connected with the negative electrode of the third switching element and whose cathode is connected with the neutral point, when the short-circuited element is the second switching element or the second diode, the forbidden potential is the lower potential; and when the short-circuited element is the third switching element or the first diode, the forbidden potential is the higher potential.

6. The inverter as set forth in claim 1, wherein:

each of the three switching circuits includes:

a first switching element connected between the higher-potential wiring and the output wiring;

a second switching element connected between the neutral point and the output wiring;

a third switching element connected in series with the second switching element between the neutral point and the output wiring;

a fourth switching element connected between the output wiring and the lower-potential wiring;

a first intermediate diode connected, with its cathode oriented toward the neutral point side, in parallel to the second switching element; and a second intermediate diode connected, with its cathode oriented toward the output wiring side, in parallel to the third switching element, when the short-circuited element is the second switching element, the forbidden potential is the lower potential; and when the short-circuited element is the third switching element, the forbidden potential is the higher potential.

\* \* \* \* \*